United States Patent [19]
Nakata

[11] Patent Number: 5,761,068
[45] Date of Patent: Jun. 2, 1998

[54] CAD/CAM APPARATUS AND METHOD PROVIDING IMPROVED DISPLAY OF MACHINED WORKPIECE

[75] Inventor: Masafumi Nakata, Aichi, Japan

[73] Assignee: Mitsubishi Denki Kabushiki Kaisha, Tokyo, Japan

[21] Appl. No.: 609,917

[22] Filed: Feb. 29, 1996

[30] Foreign Application Priority Data

Jun. 19, 1995 [JP] Japan ............ 7-151785

[51] Int. Cl.$^6$ .......... G06F 19/00; G06G 7/64; G06G 7/66; G05B 19/4097
[52] U.S. Cl. .......... 364/474.24; 219/68; 219/69.15; 219/69.13; 364/474.26; 364/474.04
[58] Field of Search .......... 364/474.24, 191, 364/474.26, 474.31, 474.04; 219/69.15, 69.13; 318/569, 600; 382/8

[56] References Cited

U.S. PATENT DOCUMENTS

| | | | |
|---|---|---|---|
| 4,709,231 | 11/1987 | Sakaibara et al. | 340/729 |
| 4,788,481 | 11/1988 | Niwa | 318/600 |
| 4,859,824 | 8/1989 | Ukaji et al. | 219/69.15 |
| 4,866,637 | 9/1989 | Gonzalez-Lopez et al. | 364/518 |
| 4,868,761 | 9/1989 | Hayashi | 364/474.24 |
| 4,943,938 | 7/1990 | Aoshima et al. | 364/522 |
| 5,081,332 | 1/1992 | Sakuragawa | 219/69.13 |
| 5,126,646 | 6/1992 | Fujita et al. | 318/569 |
| 5,177,689 | 1/1993 | Kinasi et al. | 364/474.26 |
| 5,200,905 | 4/1993 | Uemoto et al. | 364/474.04 |
| 5,248,867 | 9/1993 | Ohba et al. | |
| 5,278,917 | 1/1994 | Tayaoka et al. | 382/8 |
| 5,297,022 | 3/1994 | Watanabe | 364/191 |
| 5,359,530 | 10/1994 | Matsumura et al. | 364/474.26 |
| 5,422,820 | 6/1995 | Seki et al. | 364/474.24 |
| 5,471,394 | 11/1995 | Matsumura et al. | 364/474.26 |
| 5,532,933 | 7/1996 | Nakata | 364/474.24 |
| 5,610,842 | 3/1997 | Seki et al. | 364/551.02 |
| 5,621,648 | 4/1997 | Crump | 364/468.19 |

*Primary Examiner*—Reba I. Elmore
*Assistant Examiner*—Sheela S. Rao
*Attorney, Agent, or Firm*—Sughrue, Mion, Zinn, Macpeak & Seas, PLLC

[57] ABSTRACT

A machining path in die sinking electrospark machining is more precisely checked before actual machining by displaying shaded images of a machined surface of a workpiece during and after die sinking electrospark machining, whereby and faulty machining operation in die sinking electrospark machining is minimized. A CAD/CAM apparatus for continuously generating a machining path in accordance with a defined machining profile and a defined machining process in machining by a machining center and die sinking electrospark machining is provided having Z height generating means for converting defined shapes of a workpiece, a cutting tool and an electrode to pixel data in terms of Z height and updating the Z height pixel data in response to an operation of the cutting tool while the machining path is being generated, and a brightness data generating unit for generating brightness data of the shapes of the workpiece and electrode from the Z height pixel data and updating the brightness data in response to the operation of the cutting tool while the machining path is being generated. In accordance with the invention, machined surfaces of the electrode and of the workpiece during and after machining are displayed in shaded patterns.

13 Claims, 30 Drawing Sheets

FIG. 6

| ELECTROSPARK MACHINING CONDITIONS |||||||
|---|---|---|---|---|---|
| NO. | REMAINING ALLOWANCE Z | REMAINING ALLOWANCE R | ROCKING PATTERN | SPEED | ELECTRICAL CONDITION |
| 10 | 394 | 269 | 200 | 20 | 108 |
| 12 | 371 | 262 | 200 | 20 | 109 |

~d1

| MACHINING CONDITIONS FOR THE MACHINING CENTER ||||||
| NO. | CUTTING TOOL | FINISHING ALLOWANCE | INFEED AMOUNT | SPEED | REVOLUTION RATE | ... |
| 1 | EM01 | 1 | 10 | 1000 | 2000 | |
| 2 | EM02 | 0 | 3 | 800 | 1500 | |

~d1

CAD/CAM APPARATUS AND METHOD PROVIDING IMPROVED DISPLAY OF MACHINED WORKPIECE

BACKGROUND OF THE INVENTION

The present invention relates to a CAD/CAM apparatus which generates a machining path (sometimes hereinafter referred to simply as a "path"), and also to a machining simulation method. More particularly, the invention relates to a CAD/CAM apparatus and machining simulation method which are capable of displaying a realistic shaded machining profile of a workpiece.

FIG. 26 shows a schematic block diagram of a construction of a conventional CAD/CAM apparatus. The conventional CAD/CAM apparatus comprises a central processing unit (CPU) 1 which carries out control and calculation processing for the overall apparatus, a profile generating unit 12a for generating a machining profile and a shape of the workpiece to be machined by a machining center, a machining step generating unit 13a for a machining step for machining by the machining center, a Z height generating unit 14a for converting the shape of the workpiece and a shape of a cutting tool to Z height data, a brightness generating unit 15a for generating brightness data of the shape of the workpiece and the shape of the cutting tool from the Z height data, a machining center path generating unit 16 for generating a machining path for machining by the machining center, an input unit 2 for entering input data and command data into the CPU 1, a display unit 3 for displaying the profile data and the path based on the results of calculations of the CPU 1, a storage unit 4 for storing operation program data and the results of calculations of the CPU 1, and an output unit 5 for outputting the contents displayed on the display unit 3 by printing.

The following describes a method for displaying, in shaded patterns, a workpiece as shown in FIG. 9, a dynamic machining operation as shown in FIG. 25, and a finished profile after cutting as shown in FIG. 26, by machining a rectangular parallelopiped workpiece w1 as shown in FIG. 3 and generating a path for obtaining a finished profile as shown in FIG. 30B by means of a conventional CAD/CAM apparatus having the above-described construction, according to a machining profile mode diagram of the machining center shown in FIG. 28, a machining process mode diagram shown in FIG. 29, a workpiece shape mode diagram shown in FIG. 3, a workpiece shape Z height mode diagram shown in FIGS. 13A and 13B, a cutting tool shape Z height mode diagram shown in FIGS. 33A and 33B, a workpiece cutting mode diagram shown in FIGS. 34A and 34B, a machining path mode diagram for the machining center shown in FIG. 24, a flow chart shown in FIG. 27, a conventional brightness calculation mode diagram shown in FIGS. 34A and 34B, and a conventional workpiece shape brightness mode diagram shown in FIG. 35. For displaying an image as shown in FIGS. 6 and 8 to easily discriminate whether the diagram is to be displayed on the display unit or is an illustration for internal processing, the diagram or image is surrounded with the frame d1 of the screen.

The desired shape of the workpiece w1 is generated by entering a workpiece data generating command and the width wx1, length wy1 and thickness wz1 of the workpiece shown in FIG. 3 from the input unit 2. (In FIG. 2, step S1: Designate Shape of Workpiece)

A machining profile w21 for the machining center is generated by the profile generating unit 12a by entering a profile data generating command, a coordinate value of line c1 which indicates a wall part of the machining profile shown in FIG. 28 (although it is shown as a straight line in FIG. 28, it may be a curved line), machining width cx1 and machining depth cz1 from the input unit 2. (Step S3a: Designate Machining Profile)

In addition, a machining process is generated by the machining process generating unit 13a by entering a command for opening the machining condition table shown in FIG. 29 and the machining conditions from the input unit 2. (Step S4a: Designate Machining Process)

A command for generating machining paths k11, k12 and k13 for the machining center shown in FIG. 30B is entered from the input unit 2. (Step S5a: Designate Path Generation)

Subsequently, the CPU instructs the Z height generating unit 14a to generate Z height data shown in FIGS. 13A and 13B from the workpiece shape w1 shown in FIG. 3. The Z height is equivalent to the number of display pixels bx1 and by1 of the display screen d1 as shown in FIG. 12. (Step S6a: Designate Generation of Z Height of Workpiece Shape)

Furthermore, the CPU 1 instructs the Z height generating unit 14a to generate Z height data of the cutting tool shape t1 shown in FIGS. 33A and 33B. (Step S7a: Designate Generation of Z Height of Cutting Tool Shape)

The CPU 1 offsets the curve c1 shown in FIG. 30A by an amount equal to the radius of the cutting tool to generate the line c11, and instructs the machining center path generating unit 16 to generate a path k11 shown in FIG. 30B which traces line c11. (Step S8a: Designate Generation of Path)

Subsequently, CPU 1 instructs the Z height generating unit 14a to remove the Z height data of the cutting tool shown in FIG. 27 and the Z height data of the workpiece shape shown in FIGS. 13A and 13B and update the Z height data of a machined part as shown in FIGS. 34A and 34B according to the path k11 shown in FIG. 30B. (Step S9a: Designate Z Height Updating)

In addition, the CPU 1 instructs the brightness generating unit 15a to generate, as shown in FIG. 35, the brightness of the finished profile shown in FIG. 36 from angles a21 and a22 formed by a direction vector r1 of a light from a light source and normal vectors n21 and n22 of the finished profile w21, which is obtained from the Z height data of the workpiece shape shown in FIG. 28, and the display unit 3 to display the shape of the workpiece as shown in FIG. 8 and a shaded dynamic cutting operation image as shown in FIG. 31. (Step S10a: Designate Calculation of Brightness).

The CPU 1 instruct the curve c11 shown in FIG. 30A to be offset by an amount equal to the infeed amount of the cutting tool to generate a line c12, generate a path k13 which runs between curves c1 and c2 and a path k12 which traces the line c12, display the finished profile data as shown in FIG. 26 by repeating steps S9a to S10a as on the path k11, and display the shaded finished profile image data as shown in FIG. 32, thus finishing the processing. (Step S11: Designate Dynamic Image Display)

The conventional CAD/CAM apparatus which is constructed as described above is though accompanied by a problem that the machining path for die sinking electrospark machining cannot be precisely carried out since the conventional CAD/CAM apparatus is unable to display a shaded image of dynamic operation during virtual machining and a shaded image of the finished profile after virtual machining in die sinking electrospark machining, differing from machining by the machining center.

An object of the present invention, which has been made to solve the above-described problem, is to enable precise checking of a machining path on the CAD/CAM before machining by generating a path for die sinking electrospark machining and displaying the shaded images.

SUMMARY OF THE INVENTION

A CAD/CAM apparatus according to the present invention for generating a machining path based on machining positions and machining processes of defined die sinking electrospark machining comprises die sinking electrospark machining path generation means for generating a machining path for the die sinking electrospark machining, Z height generating means for converting defined shapes of a workpiece and an electrode to data in terms of Z height and updating the Z height data in response to a virtual operation of the electrode while the machining path is being generated, brightness data generating means for generating brightness data of the shapes of the workpiece and electrode from the Z height data and updating the brightness data in response to the virtual operation of the electrode while the machining path is being generated, and display means for displaying the shaded shapes of the electrode at least in virtual operation and the workpiece or a shaded shape of a finished profile.

A CAD/CAM apparatus according to the present invention comprises Z height inverting means for inverting the Z height data indicating the shape of a workpiece generated by Z height generating means and generating Z height data of the electrode for die sinking electrospark machining, and machining center machining path generation means for generating a machining path based on a machining profile and a defined machining process by a defined machining center, wherein the electrode for die sinking electrospark machining is machined by the machining center.

A CAD/CAM apparatus according to the present invention comprises Z height inverting means for inverting the Z height data indicating the shape of the workpiece generated by Z height generating means and generating Z height data of the electrode for die sinking electrospark machining and wire electrospark machining path generation means for generating a machining path based on a machining profile and a defined machining process in defined wire electrospark machining, wherein the electrode for die sinking electrospark machining is machined by the machining center.

A CAD/CAM apparatus according to the present invention comprises machining condition automatic calculation means for automatically calculating machining conditions for the machining center such as an infeed amount, a cutting tool revolution rate and a feed rate based on a volume of stock to be removed in machining processes of die sinking electrospark machining which is obtained by the Z height generating means and controlling the feed rate in accordance with a cutting load.

A CAD/CAM apparatus according to the present invention comprises electrical condition automatic calculating means for automatically calculating electrical conditions of the electrode for die sinking electrospark machining based on a volume of stock to be removed which is obtained by the Z height generating means in accordance with the types of materials of the workpiece and the electrode.

A CAD/CAM apparatus according to the present invention comprises machining path check means which enables to generate Z height data and brightness data by reading generated machining path data.

A CAD/CAM apparatus according to the present invention comprises image data registering means which enables registration of Z height data and brightness data of the workpiece and the electrode obtained after the machining path has been generated as an irregular profile.

A machining simulation method for continuously generating a machining path in accordance with a defined machining shape and machining process in machining center machining and die sinking electrospark machining according to the present invention comprises the steps of: generating a machining path for the machining center, converting defined shapes of a workpiece and a tool into pixel data in terms of Z height and updating the Z height pixel data in response to the operation of the tool while the machining path is being generated, generating brightness data of the shapes of the workpiece and the tool from the Z height pixel data and updating the brightness data in response to the operation of the tool while the machining path is being generated, inverting the Z height pixel data of the workpiece generated by the Z height generating step and generating Z height pixel data of an electrode for die sinking electrospark machining, generating a machining path for the die sinking electrospark machining, converting defined shapes of a workpiece and electrode into pixel data in terms of Z height and updating the Z height pixel data in response to the operation of the electrode while the machining path is being generated, and generating brightness data of the shapes of the workpiece, tool and electrode from the Z height pixel data and updating the brightness data in response to the operation of the electrode while the machining path is being generated.

A machining simulation method for continuously generating a machining path in accordance with a defined machining shape and machining process in wire electrospark machining and die sinking electrospark machining according to the present invention comprises the steps of: generating a machining path for the wire electrospark machining, converting defined shapes of a workpiece and a tool into pixel data in terms of Z height and updating the Z height pixel data in response to the operation of the tool while the machining path is being generated, generating brightness data of the shapes of the workpiece and the tool from the Z height pixel data and updating the brightness data in response to the operation of the tool while the machining path is being generated, inverting the Z height pixel data of the workpiece generated by the Z height generating step and generating Z height pixel data of an electrode for die sinking electrospark machining, generating a machining path in the die sinking electrospark machining, converting defined shapes of the workpiece and the electrode into pixel data in terms of Z height and updating the Z height pixel data in response to the operation of the electrode while the machining path is being generated, and generating brightness data of the shapes of the workpiece, the tool and the electrode from the Z height pixel data and updating the brightness data in response to the operation of the electrode while the machining path is being generated.

A machining simulation method for continuously displaying the shape of removal and an electrode in accordance with defined shapes of a workpiece and the electrode by reading a machine path data which has been generated according to the present invention comprises the steps of: converting the defined shapes of a workpiece and the electrode into pixel data in terms of Z height and updating the Z height pixel data in response to the operation of the electrode while the machining path is being read, and generating brightness data of the shapes of the workpiece and the electrode from the Z height pixel data and updating the brightness data in response to the operation of the electrode while the machining path is being read.

A machining simulation method for continuously generating a machining path in accordance with a defined machining shape and machining process in die sinking electrospark machining according to the present invention, comprises the steps of: specifying the shape of an electrode, converting the shape of the electrode into pixel data in terms of Z height, and registering the Z height pixel data which has been generated.

A machining simulation method for continuously generating a machining path in accordance with a defined machining shape and machining process in machining center machining according to the present invention, comprises the steps of: generating a machining path for the machining center, converting defined shapes of a workpiece and a tool into pixel data in terms of Z height and updating the Z height pixel data in response to the operation of the tool while the machining path is being generated, calculating a volume of removal which is removed from the workpiece by the tool in response to the operation of the tool, calculating a tool feed speed in accordance with the volume of removal, and dividing one block into a plurality of blocks and determining a speed of each divided block when the speed in one block in the machining path is changed.

A machining simulation method for continuously generating a machining path in accordance with a defined machining shape and machining process in die sinking electrospark machining according to the present invention, comprises the steps of: generating a machining path for the die sinking electrospark machining, converting defined shapes of a workpiece and an electrode into pixel data in terms of Z height and updating the Z height pixel data in response to the operation of the electrode while the machining path is being generated, calculating a volume of removal which is removed from the workpiece by the electrode in response to the operation of the electrode, and calculating an electric condition in accordance with the volume of removal.

BRIEF DESCRIPTION OF THE DRAWINGS

FIG. 6 is an illustration showing a machining process of die sinking electrospark machining in the CAD/CAM apparatus shown in FIG. 1.

DESCRIPTION OF THE PREFERRED EMBODIMENTS

Figure 1:
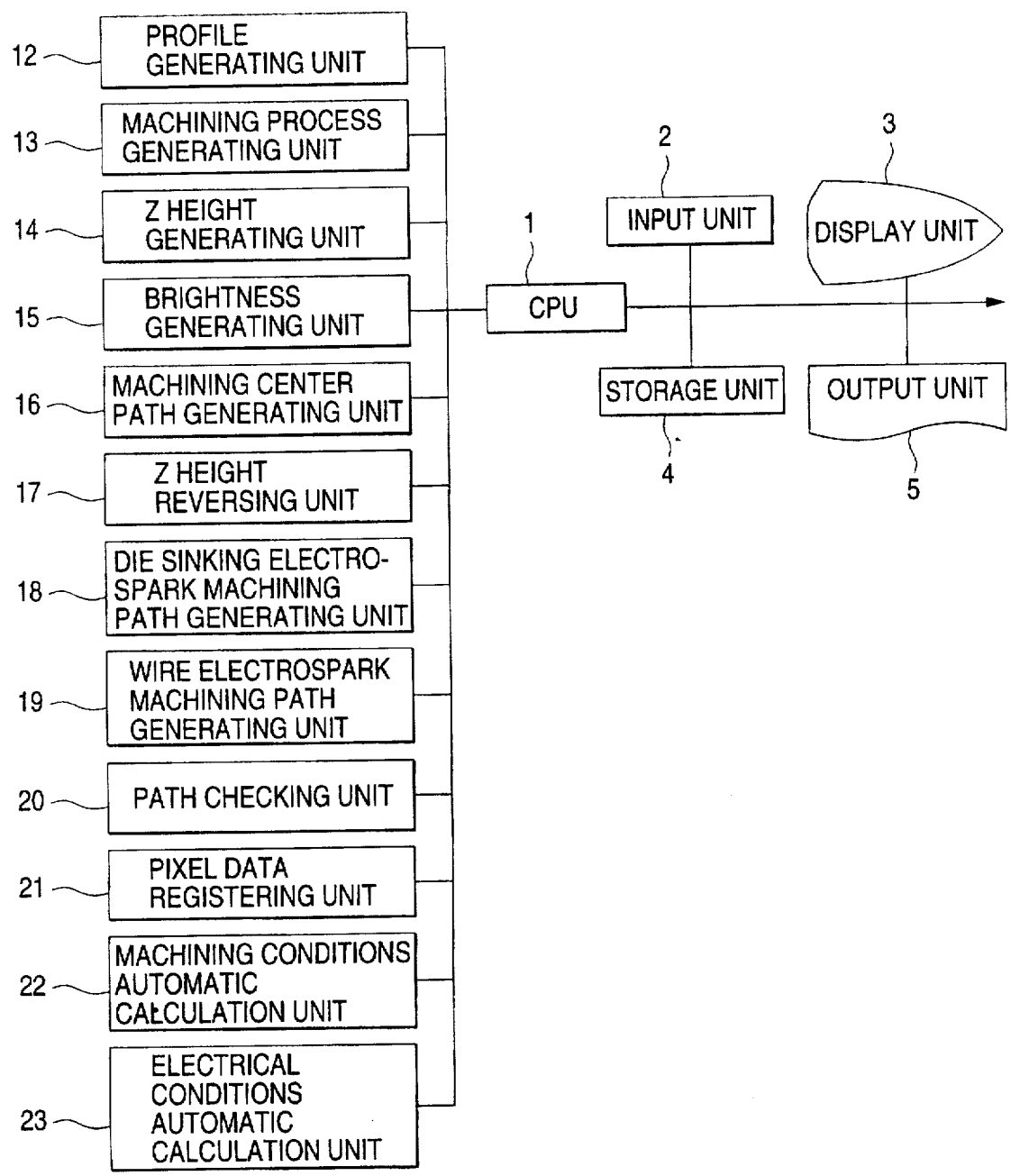
FIG. 1 is a block diagram showing a configuration of a CAD/CAM apparatus according to an embodiment of the present invention.

A CAD/CAM apparatus according to the present invention is adapted to generate a machining path for die sinking electrospark machining by die sinking machining path generation means, convert defined shapes of a workpiece and an electrode to Z height data by Z height generating means, update Z height data in response to virtual operation of the electrode during generation of the machining path, generate brightness data of the shapes of the workpiece and electrode by brightness generating means, update brightness data in response to the virtual operation of the electrode during generation of the machining path, and display shaded images of the shapes of electrode and workpiece in the virtual operation or a shaded image of a finished profile according to the brightness data.

The Z height inverting means is employed to invert Z height data of a workpiece generated by Z height generating means and generate Z height data of an electrode for die sinking electrospark machining.

The Z height inverting means is used to invert Z height data of a workpiece generated by Z height generating means and generate Z height data of an electrode for wire electrospark machining.

The CAD/CAM apparatus according to the present invention is provided with a machining condition automatic calculation means capable of automatically calculating an infeed amount, a revolution rate of a cutting tool and a feed rate as machining conditions for a machining center by varying in steps the cutting speed in inverse proportion to the volume of stock to be removed by cutting obtained from the Z height generating means and adjusting the cutting load during generation of the path to be approximately fixed.

The CAD/CAM apparatus according to the present invention is provided with an electrical automatic calculation means capable of automatically calculating electrical conditions of the electrode for die sinking electrospark machining based on the volume of the stock of removal obtained from the Z height generating means from the types of materials of the workpiece and electrode.

The CAD/CAM apparatus according to the present invention is provided with machining path checking means capable of reading the machining path data generated and generating Z height data and brightness data.

The CAD/CAM apparatus according to the present invention is further provided with pixel data registering means capable of registering Z height data and brightness data of the workpiece and the electrode as irregular profiles after the machining data has been generated.

The machining simulation method for continuously generating a machining path in accordance with a defined machining shape and machining process in machining center machining and die sinking electrospark machining includes the steps of: generating a machining path for the machining center, converting defined shapes of a workpiece and a tool into pixel data in terms of Z height and updating the Z height pixel data in response to the operation of the tool while the machining path is being generated, generating brightness data of the shapes of the workpiece and the tool from the Z height pixel data and updating the brightness data in response to the operation of the tool while the machining path is being generated, inverting the Z height pixel data of the workpiece generated by the Z height generating step and generating Z height pixel data of an electrode for die sinking electrospark machining, generating a machining path for the die sinking electrospark machining, converting defined shapes of a workpiece and electrode into pixel data in terms of Z height and updating the Z height pixel data in response to the operation of the electrode while the machining path is being generated, and generating brightness data of the shapes of the workpiece, tool and electrode from the Z height pixel data and updating the brightness data in response to the operation of the electrode while the machining path is being generated. Thus, with the provision of the Z height inverting step, the Z height data for workpiece display when the electrode machining is conducted in the machining center is inverted so that it can be used as the Z height data for electrode display at the time of the generation of a pulse for the die electrospark machining.

The machining simulation method for continuously generating a machining path in accordance with a defined machining shape and machining process in wire electrospark machining and die sinking electrospark machining includes the steps of: generating a machining path for the wire electrospark machining, converting defined shapes of a workpiece and a tool into pixel data in terms of Z height and updating the Z height pixel data in response to the operation of the tool while the machining path is being generated, generating brightness data of the shapes of the workpiece and the tool from the Z height pixel data and updating the brightness data in response to the operation of the tool while the machining path is being generated, inverting the Z height pixel data of the workpiece generated by the Z height generating step and generating Z height pixel data of an electrode for die sinking electrospark machining, generating a machining path in the die sinking electrospark machining, converting defined shapes of the workpiece and the electrode into pixel data in terms of Z height and updating the Z height pixel data in response to the operation of the electrode while the machining path is being generated, and generating brightness data of the shapes of the workpiece, the tool and the electrode from the Z height pixel data and updating the brightness data in response to the operation of the electrode while the machining path is being generated. Thus, with the provision of the Z height inverting step, the Z height data for workpiece display when the electrode machining is conducted in the wire electrospark machining is inverted so that it can be used as the Z height data for electrode display at the time of the generation of a pulse for the wire electrospark machining.

The machining simulation method for continuously displaying the shape of removal and an electrode in accordance with defined shapes of a workpiece and the electrode by reading a machine path data which has been generated is provided with the steps of: converting the defined shapes of a workpiece and the electrode into pixel data in terms of Z height and updating the Z height pixel data in response to the operation of the electrode while the machining path is being read, and generating brightness data of the shapes of the workpiece and the electrode from the Z height pixel data and updating the brightness data in response to the operation of the electrode while the machining path is being read. With the above steps, display data with a shaded image of a finished profile can be obtained from the path data.

The machining simulation method for continuously generating a machining path in accordance with a defined machining shape and machining process in die sinking electrospark machining is implemented with the steps of: specifying the shape of an electrode, converting the shape of the electrode into pixel data in terms of Z height, and registering the Z height pixel data which has been generated. With the above step, the pixel data which has been generated is registered and taken at the time of generating another path.

The machining simulation method for continuously generating a machining path in accordance with a defined machining shape and machining process in machining center machining includes the steps of: generating a machining path for the machining center, converting defined shapes of a workpiece and a tool into pixel data in terms of Z height and updating the Z height pixel data in response to the operation of the tool while the machining path is being generated, calculating a volume of removal which is removed from the workpiece by the tool in response to the operation of the tool, calculating a tool feed speed in accordance with the volume of removal, and dividing one block into a plurality of blocks and determining a speed of each divided block when the speed in one block in the machining path is changed. With the above steps, the machining condition in the machining of the machining center can be automatically calculated.

The machining simulation method for continuously generating a machining path in accordance with a defined machining shape and machining process in die sinking electrospark machining is provided with the steps of: generating a machining path for the die sinking electrospark machining, converting defined shapes of a workpiece and an electrode into pixel data in terms of Z height and updating the Z height pixel data in response to the operation of the electrode while the machining path is being generated, calculating a volume of removal which is removed from the workpiece by the electrode in response to the operation of the electrode, and calculating an electric condition in accordance with the volume of removal. With the above steps, the electric condition of the die electrospark machining can be automatically calculated.

A preferred embodiment of the present invention is described below with reference to the accompanying drawings.

FIG. 1 is a block diagram showing a schematic configuration diagram of a CAD/CAM apparatus according to this embodiment of the present invention. The CAD/CAM apparatus shown in FIG. 1 includes a CPU 1 for carrying out control and operation processing of the whole apparatus, a profile generating unit 12 for generating a shape of the workpiece to be machined and a machining position and a shape of an electrode for die sinking electrospark machining, a machining process generating unit 13 for generating a machining process for die sinking electrospark machining by entering the electrical conditions of the electrode for the designated machining position for die sinking electrospark machining, a Z height generating unit 14 for dividing the shapes of the workpiece and electrode in the form of a matrix in the XY plane in the pixel size of the display unit 3 and calculating Z height data at respective pixels, a brightness generating unit 15 for calculating the surface brightness of the shapes of the workpiece and electrode from the Z height data and displaying the result of calculation on the display unit 3, a Z height inverting unit 17 for generating Z height data of the electrode for die sinking electrospark machining by inverting the Z height data, a die sinking electrospark machining path generation unit 18 for generating a path for die sinking electrospark machining, an input unit 2 for entering input data such as coordinate data and profile data for the CPU 1 and command data such as path generating command data, a display unit 3 for graphically displaying the profile data and the path in accordance with the results of calculations by the CPU 1, a storage unit 4 for storing operation program data and calculation results of the CPU 1, and an output unit 5 for outputting the contents displayed on the display unit 3 by printing.

Figure 2:
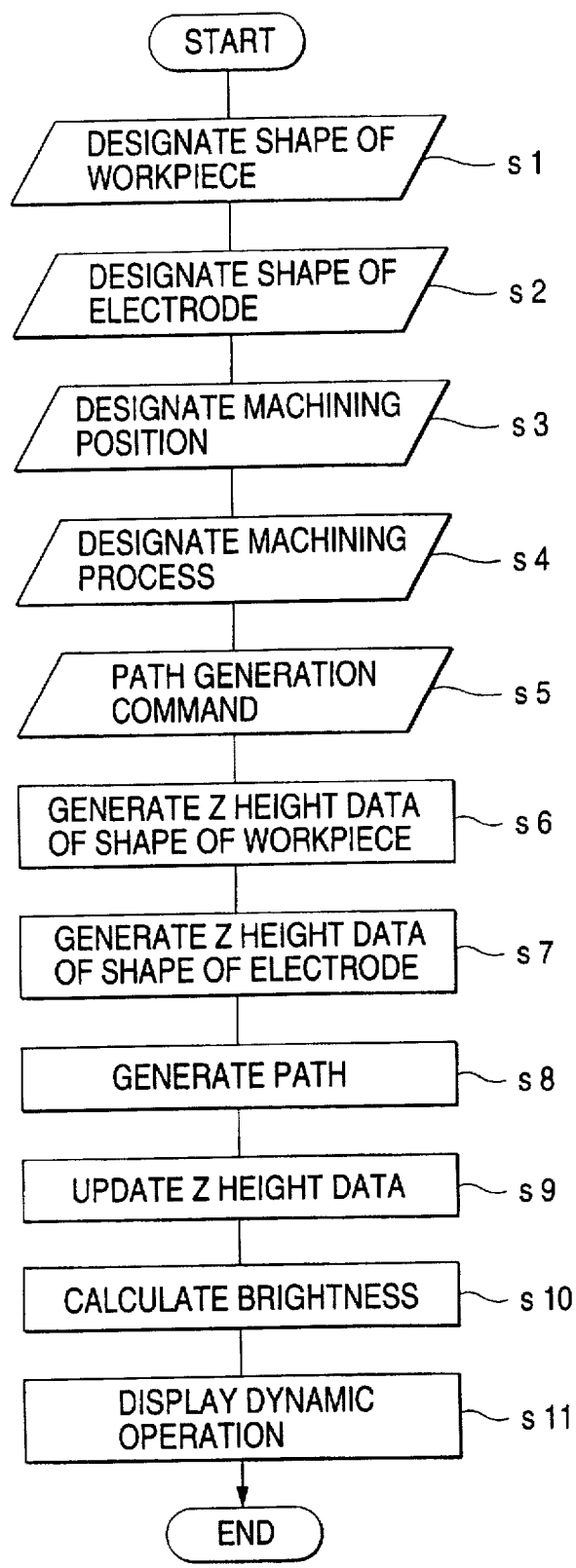
FIG. 2 is a flow chart showing the processes of dynamic display by the CAD/CAM apparatus according to an embodiment of the present invention in die sinking electrospark machining.
Figure 3:
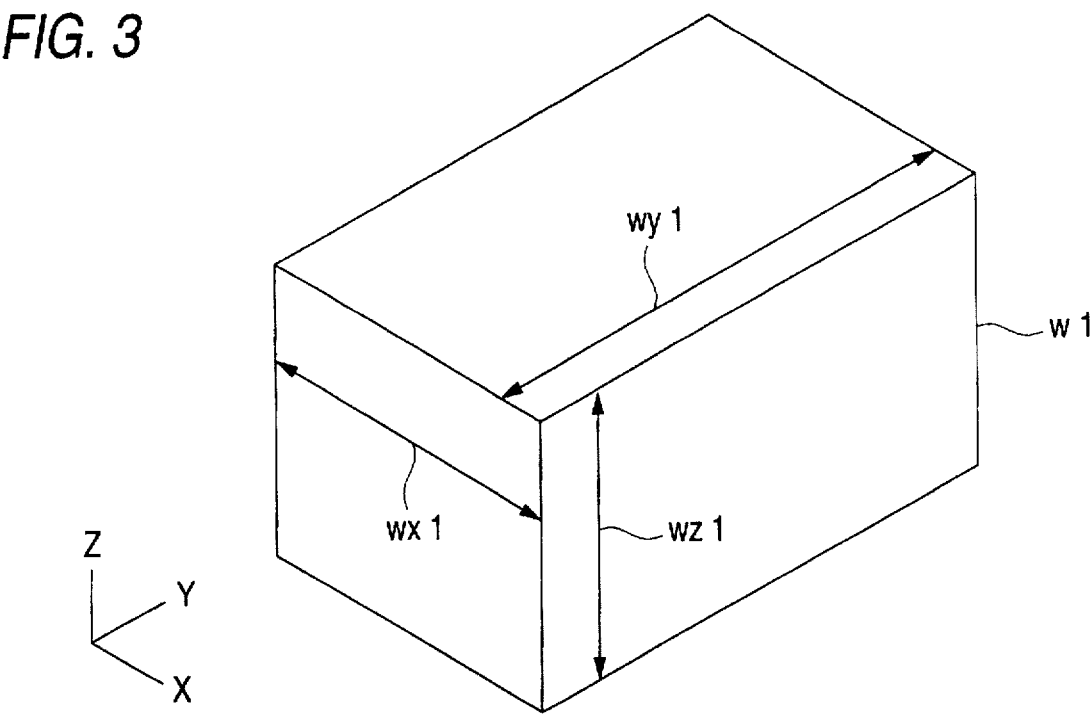
FIG. 3 is an illustration showing an example of a shape of a workpiece for die sinking electrospark machining.
Figure 4:
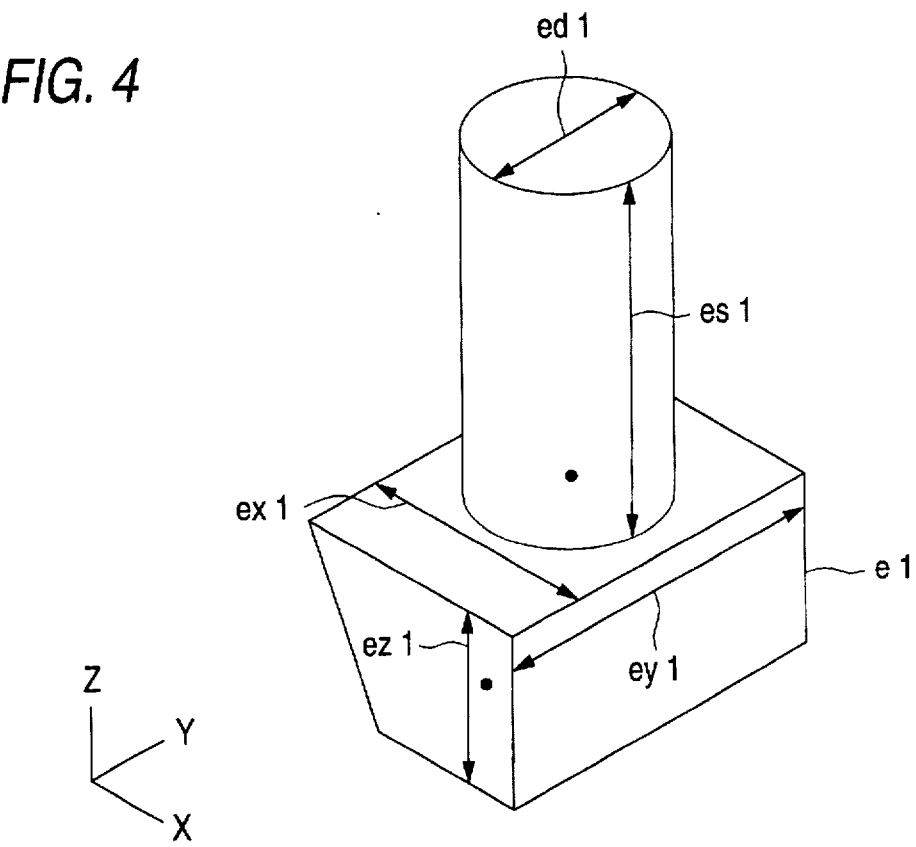
FIG. 4 is an illustration showing an example of an electrode for die sinking electrospark machining.
Figure 5:
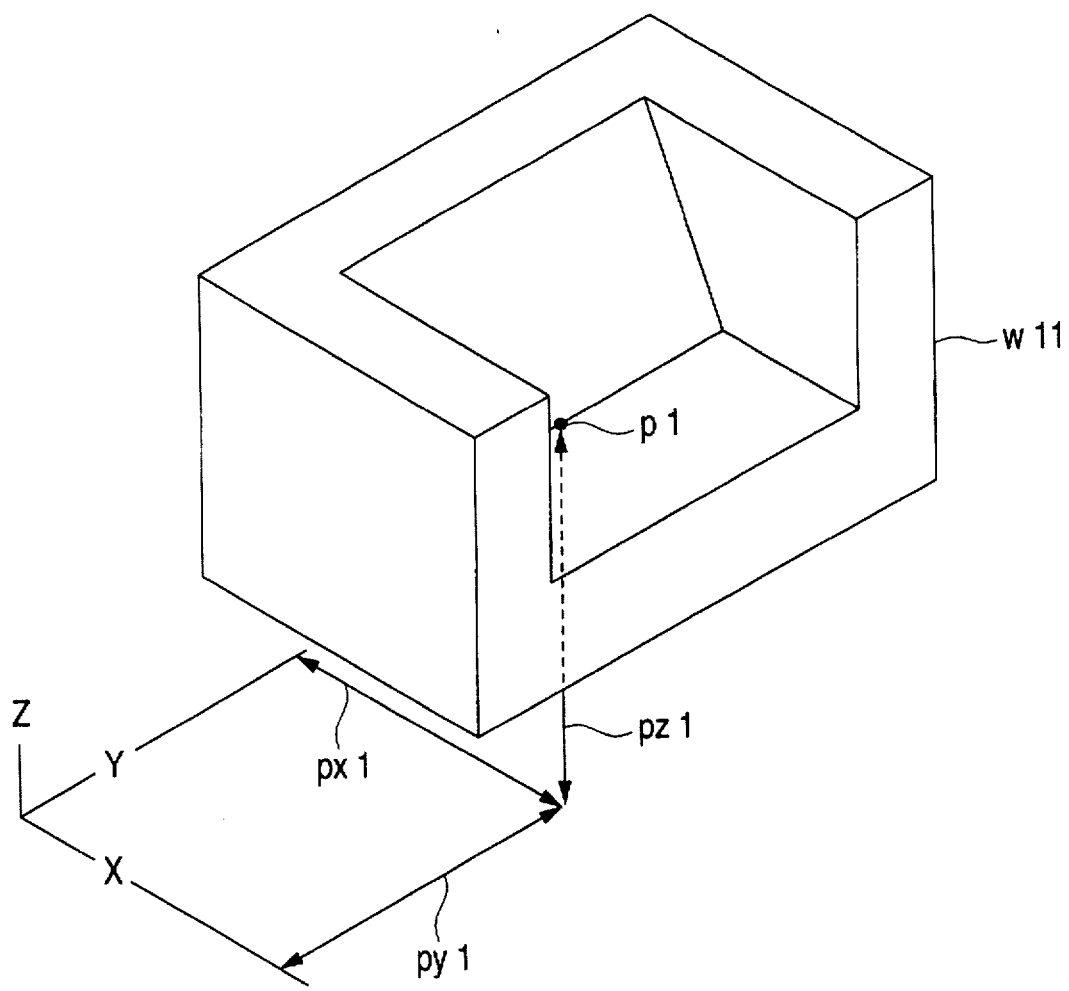
FIG. 5 is an illustration showing a finished profile obtained by die sinking electrospark machining.
Figure 7:
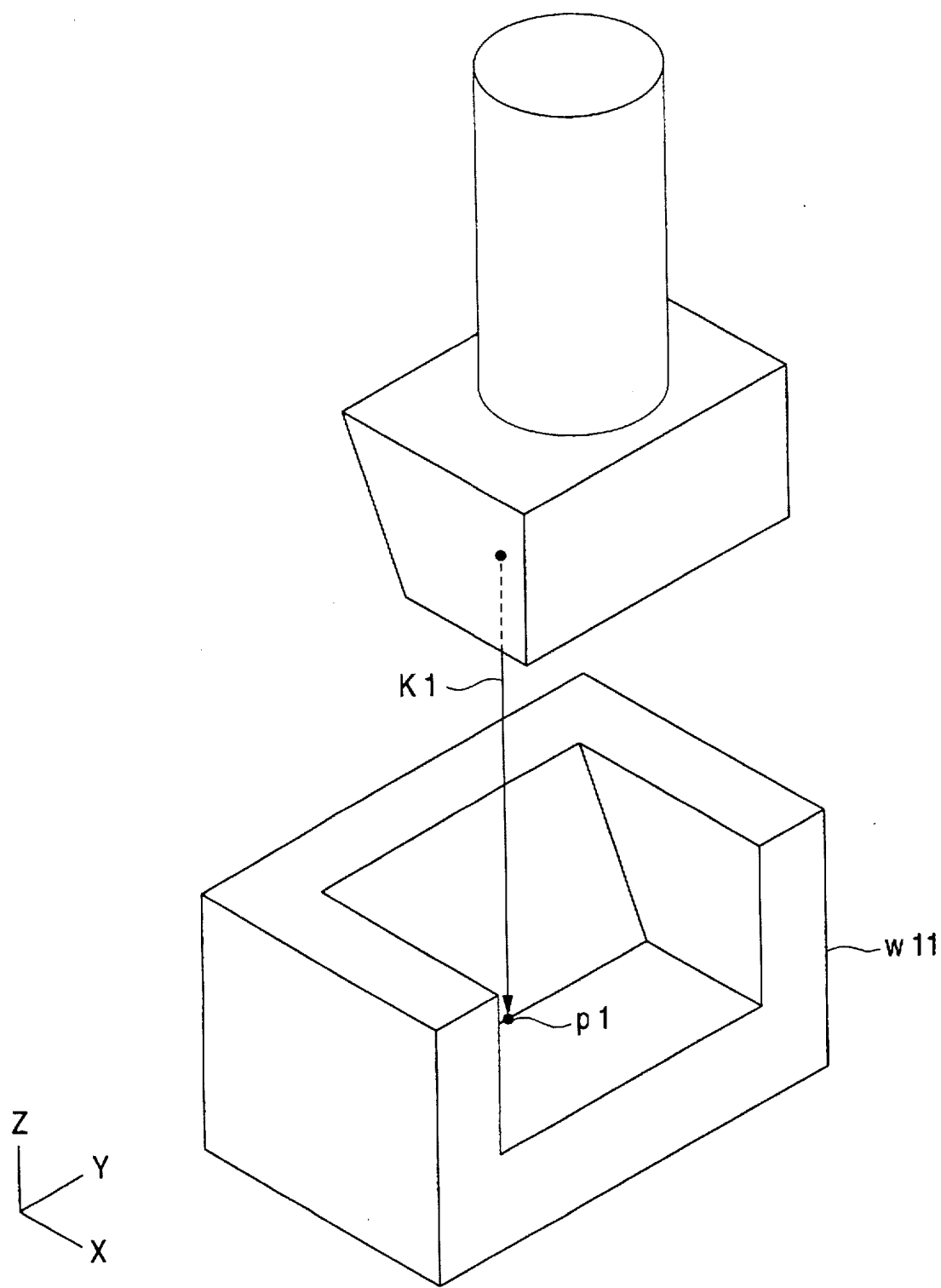
FIG. 7 is an illustration showing a path for die sinking electrospark machining in the CAD/CAM apparatus shown in FIG. 1.
Figure 8:
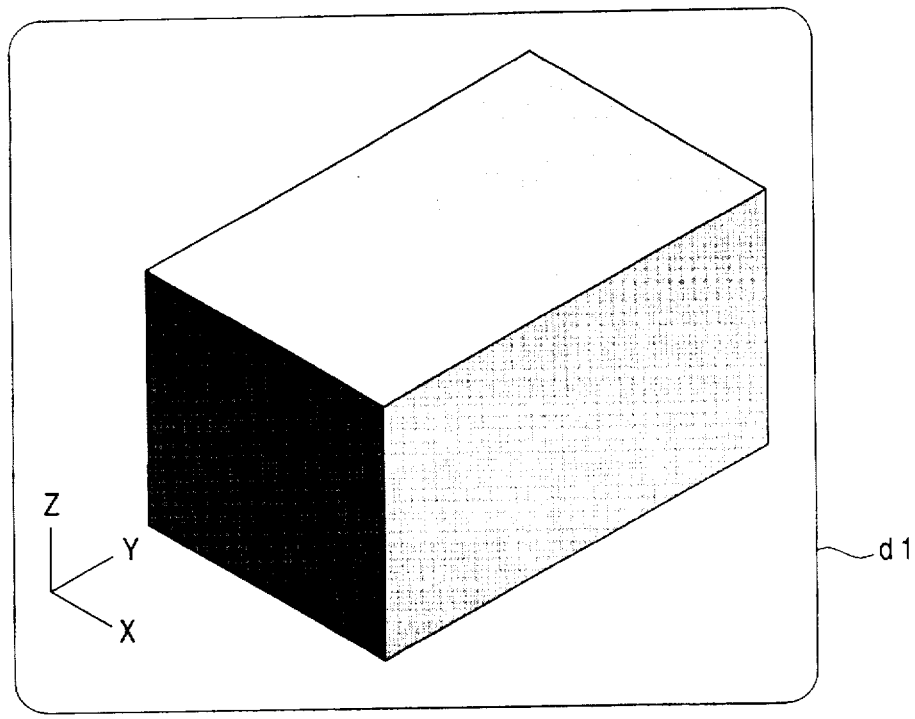
FIG. 8 is an illustration showing a shaded image of a shape of the workpiece to be machined in die sinking electrospark machining in the CAD/CAM apparatus shown in FIG. 1.
Figure 9:
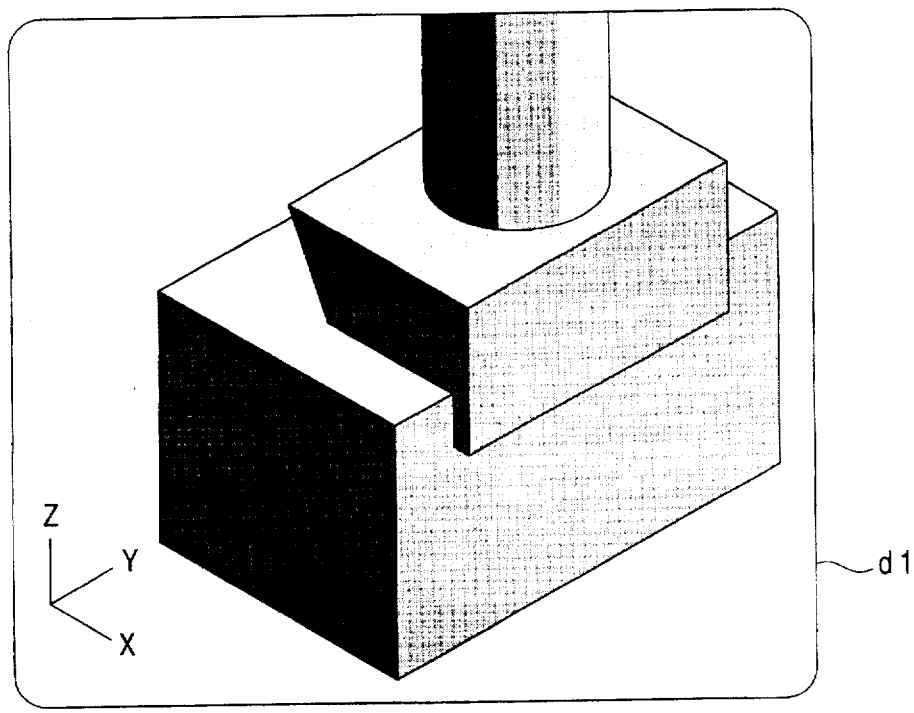
FIG. 9 is an illustration showing a shaded dynamic operating image of a shape of a workpiece and an electrode being machined in die sinking electrospark machining in the CAD/CAM apparatus shown in FIG. 1.
Figure 10:
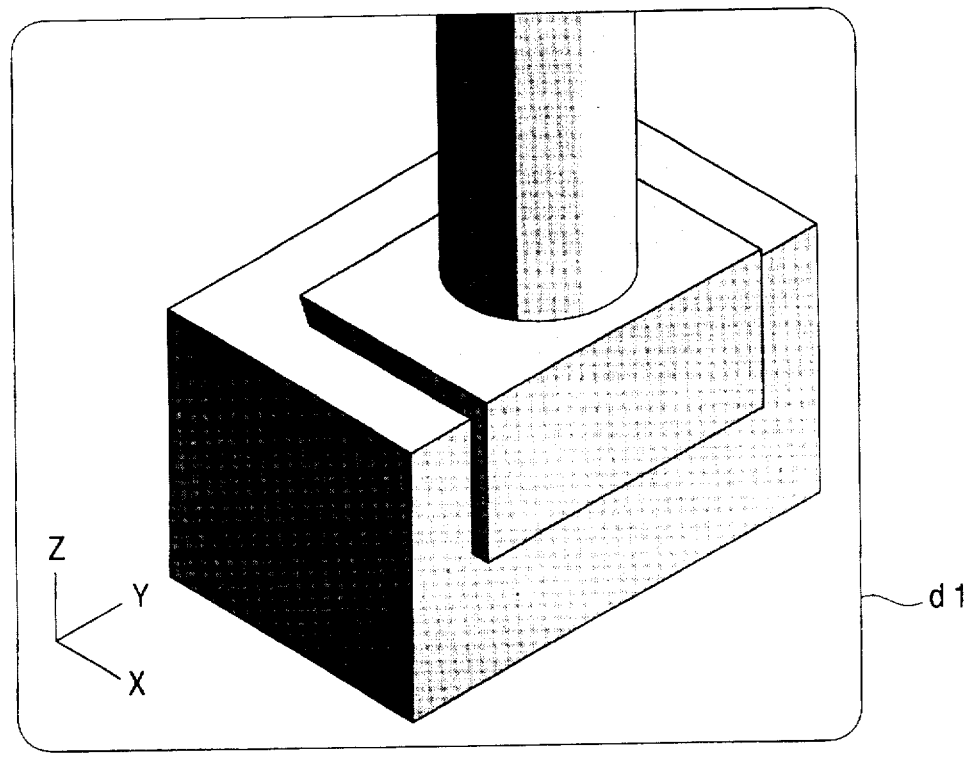
FIG. 10 is an illustration showing a shaded image of a shape of a workpiece and an electrode after having been machined in die sinking electrospark machining in the CAD/CAM apparatus shown in FIG. 1.
Figure 11:
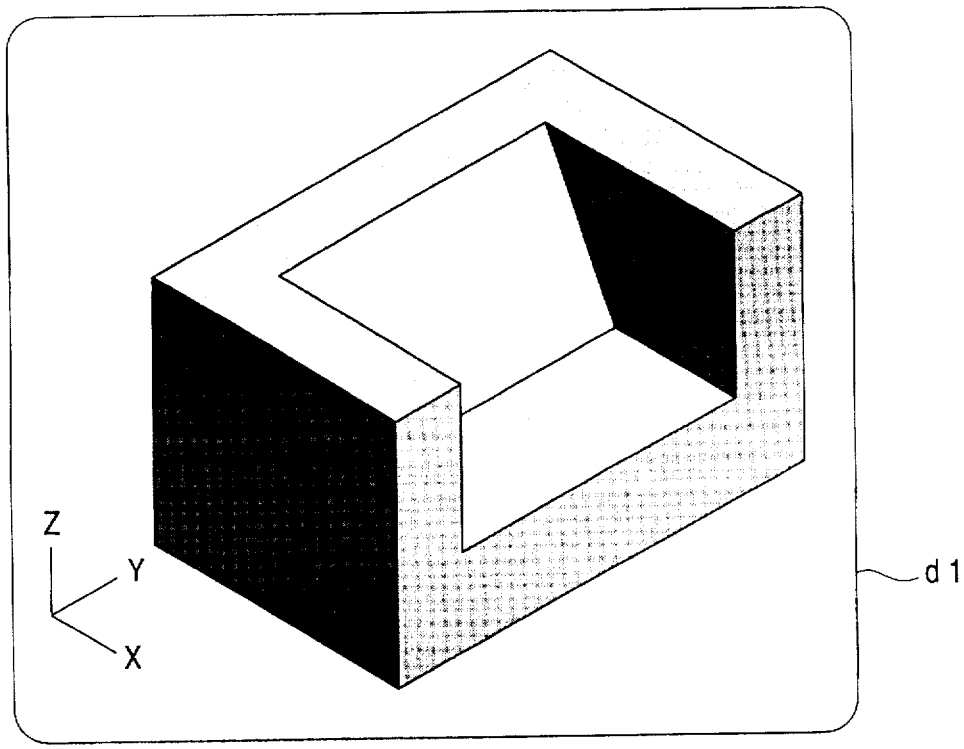
FIG. 11 is an illustration showing a shaded image of a finished profile after having been machined in die sinking electrospark machining in the CAD/CAM apparatus shown in FIG. 1.
Figure 12:
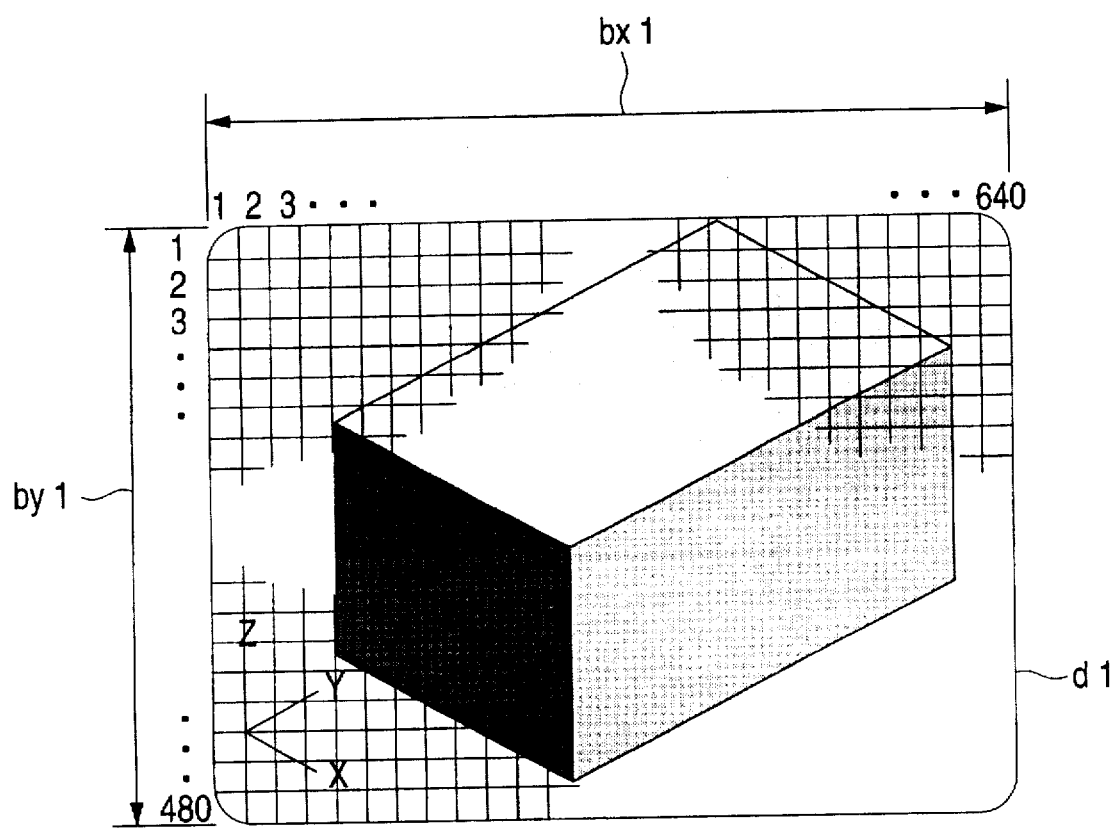
FIG. 12 is an illustration showing the pixels of the display unit of the CAD/CAM apparatus shown in FIG. 1.
Figure 13A:
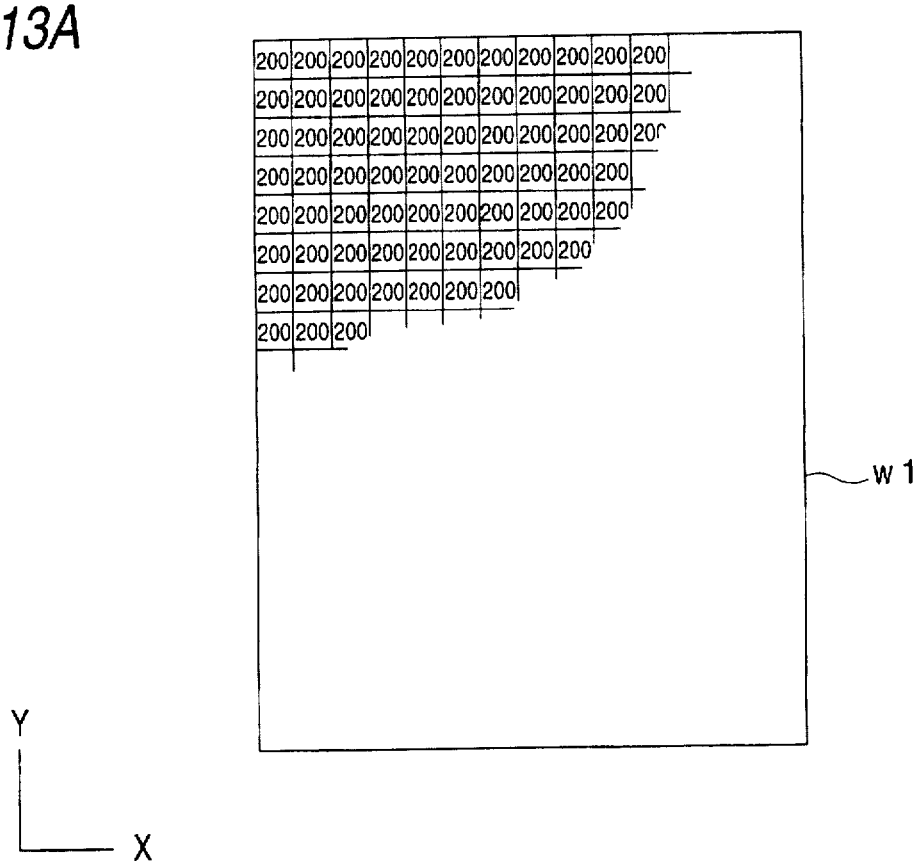
FIGS. 13A and 13B are illustrations showing the structure of Z height data of the shape of the workpiece to be machined in die sinking electrospark machining.
Figure 13B:
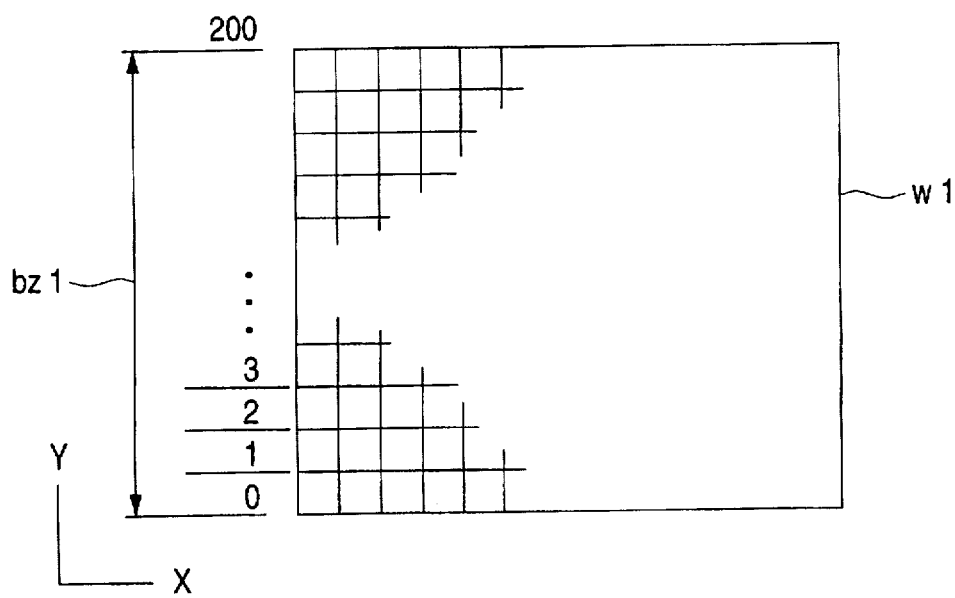
Figure 14A:
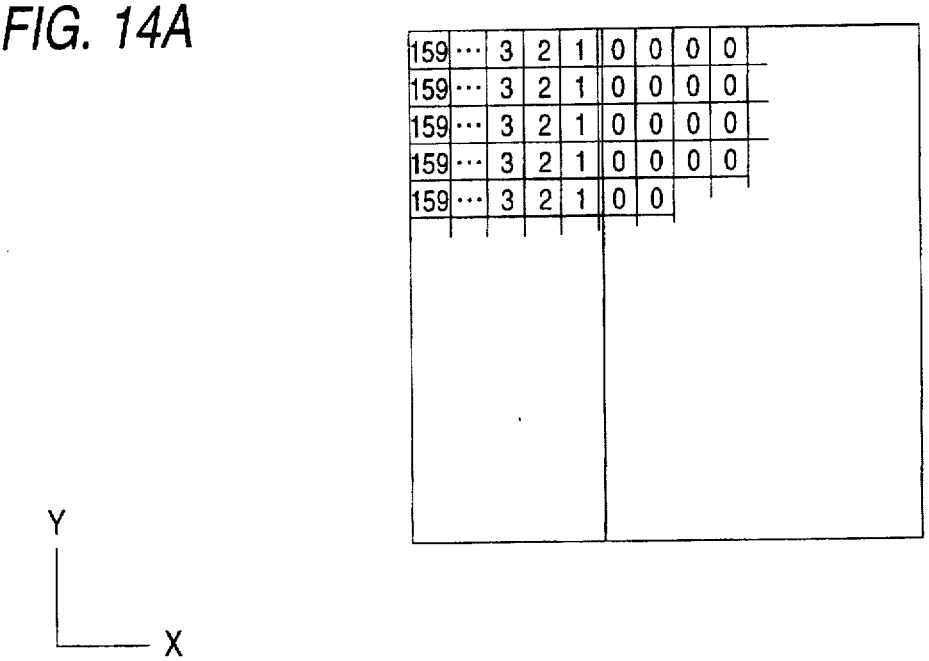
FIGS. 14A and 14B are illustrations showing the structure of Z height data of the shape of the electrode in die sinking electrospark machining in the CAD/CAM apparatus shown in FIG. 1.
Figure 14B:
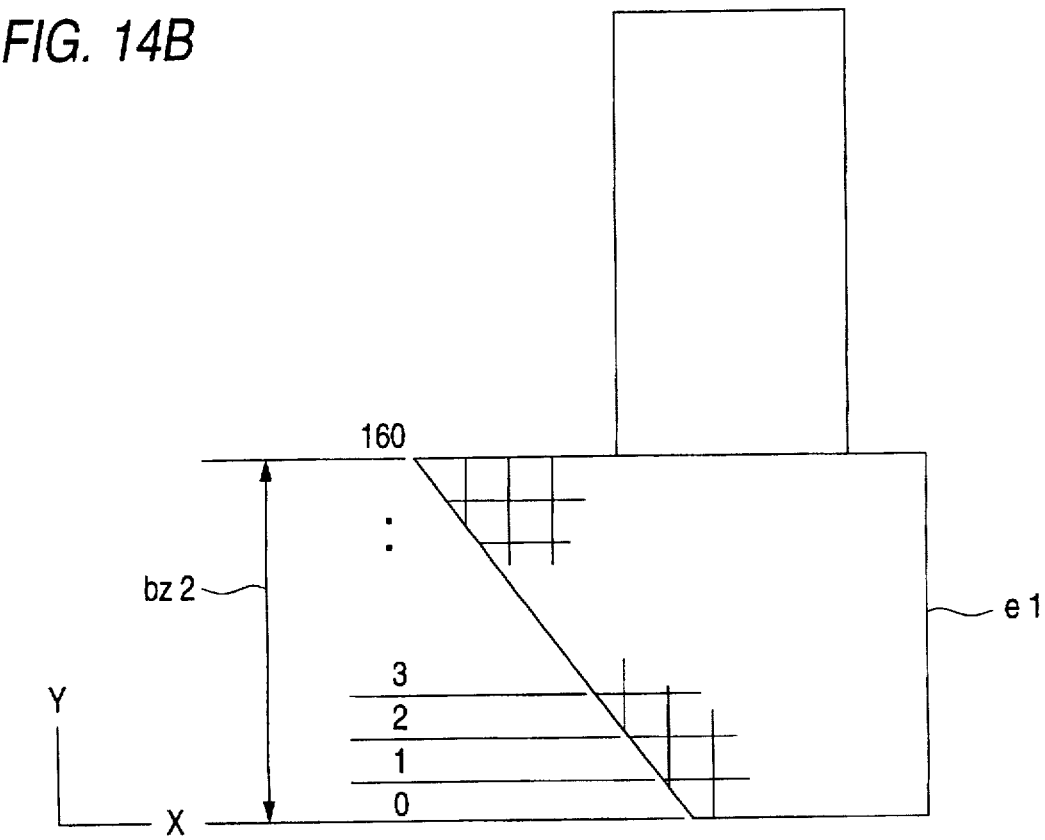
Figure 15A:
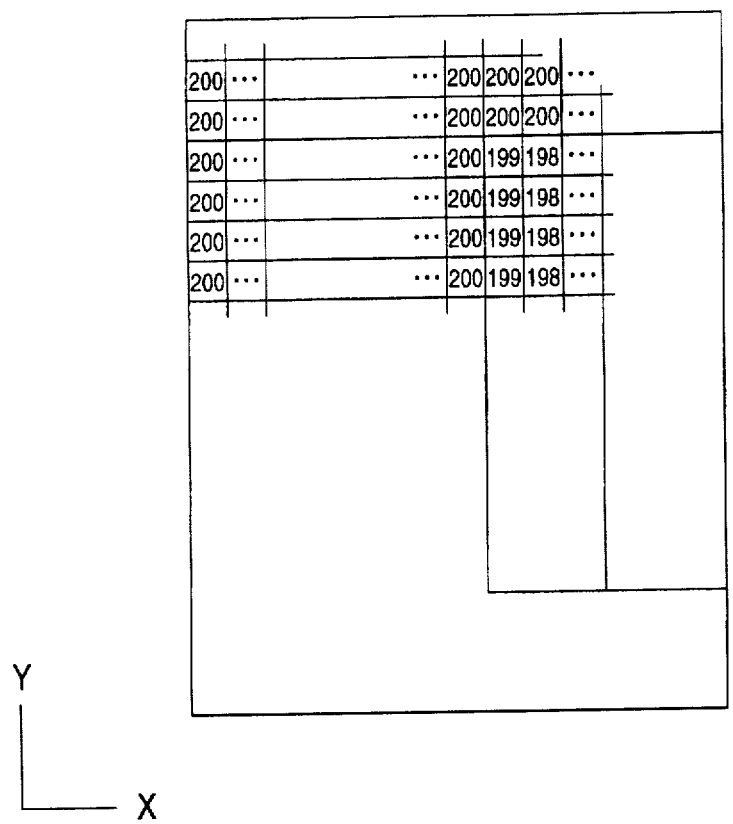
FIGS. 15A and 15B are illustrations showing the structure of Z height data in the shaded dynamic operating image of the shapes of the workpiece and the electrode being machined in die sinking electrospark machining in the CAD/CAM apparatus shown in FIG. 1.
Figure 15B:
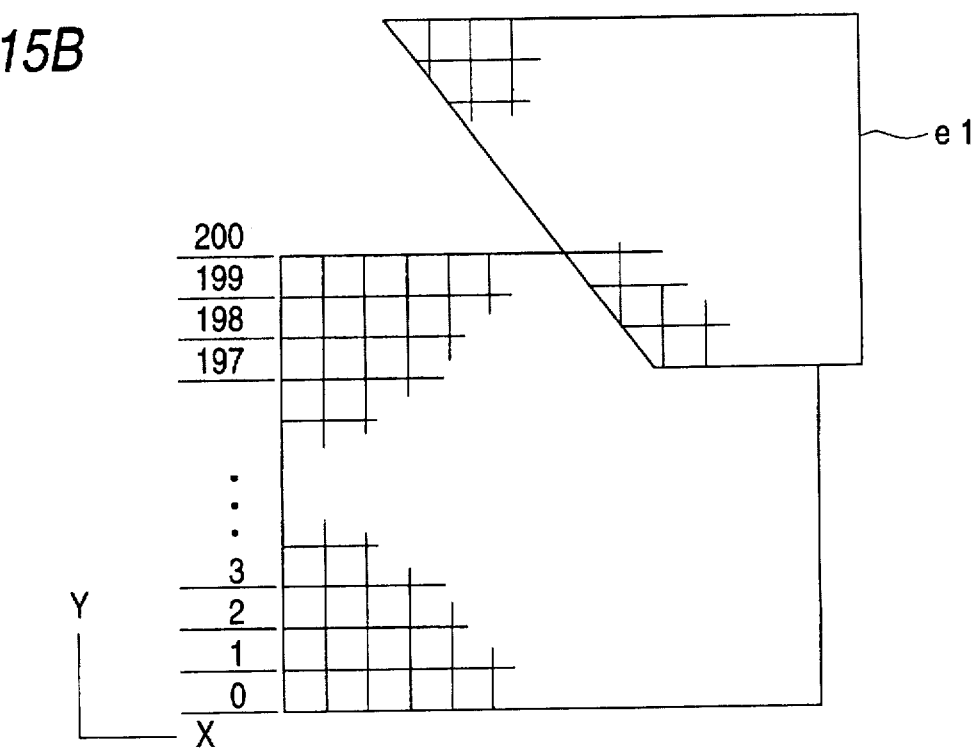
Figure 16A:
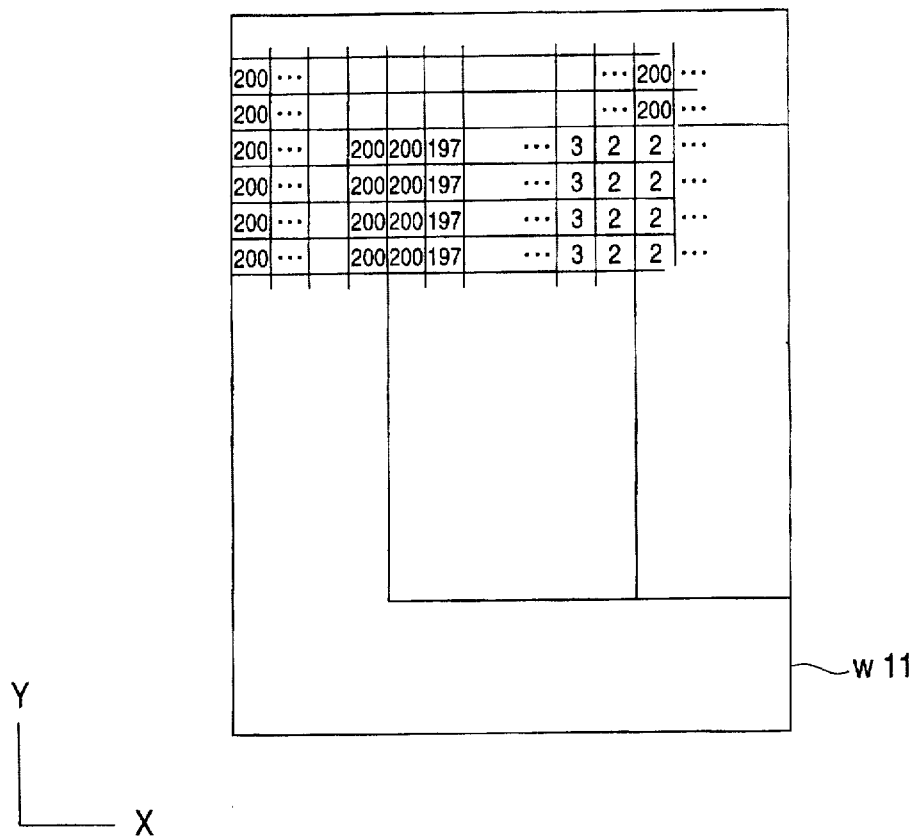
FIGS. 16A and 16B are illustrations showing the structure of Z height data in the shaded dynamic operating image of the shapes of the workpiece and the electrode after having been machined in die sinking electrospark machining in the CAD/CAM apparatus shown in FIG. 1.
Figure 16B:
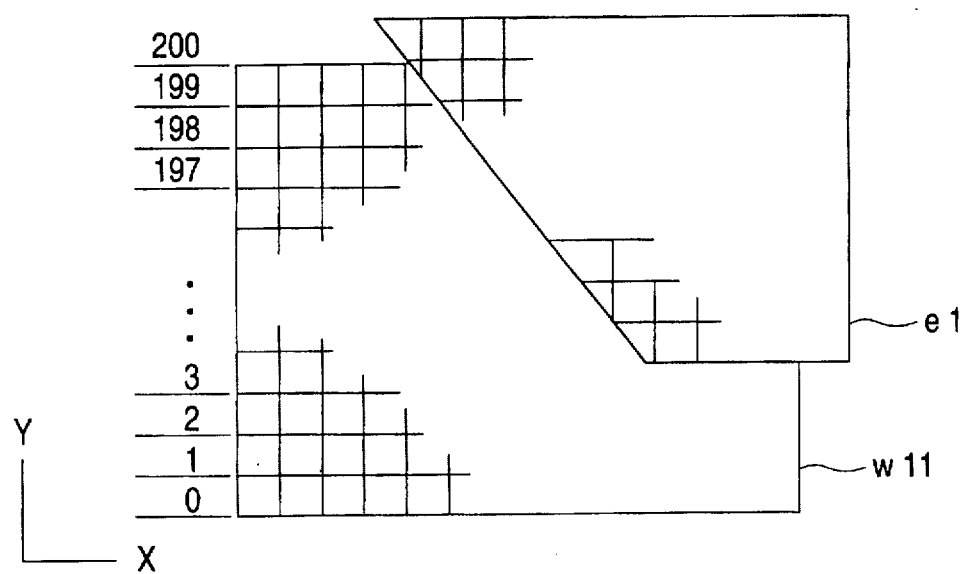
Figure 17:
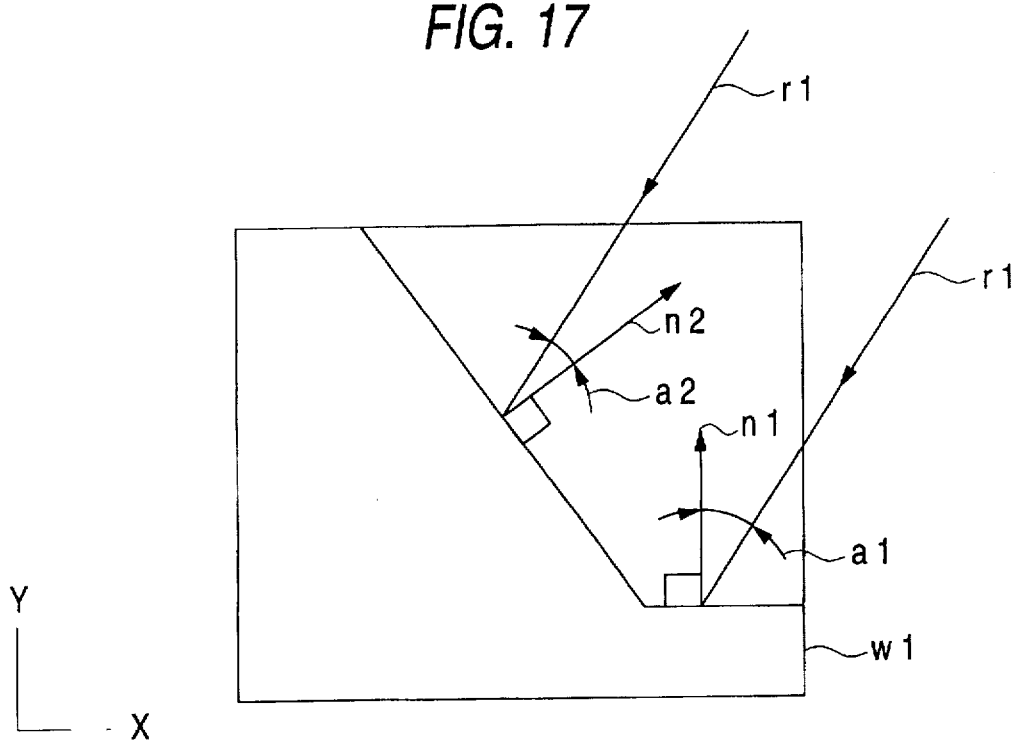
FIG. 17 is an illustration showing the principle of brightness calculation of the finished profile in die sinking electrospark machining in the CAD/CAM apparatus shown in FIG. 1.
Figure 18:
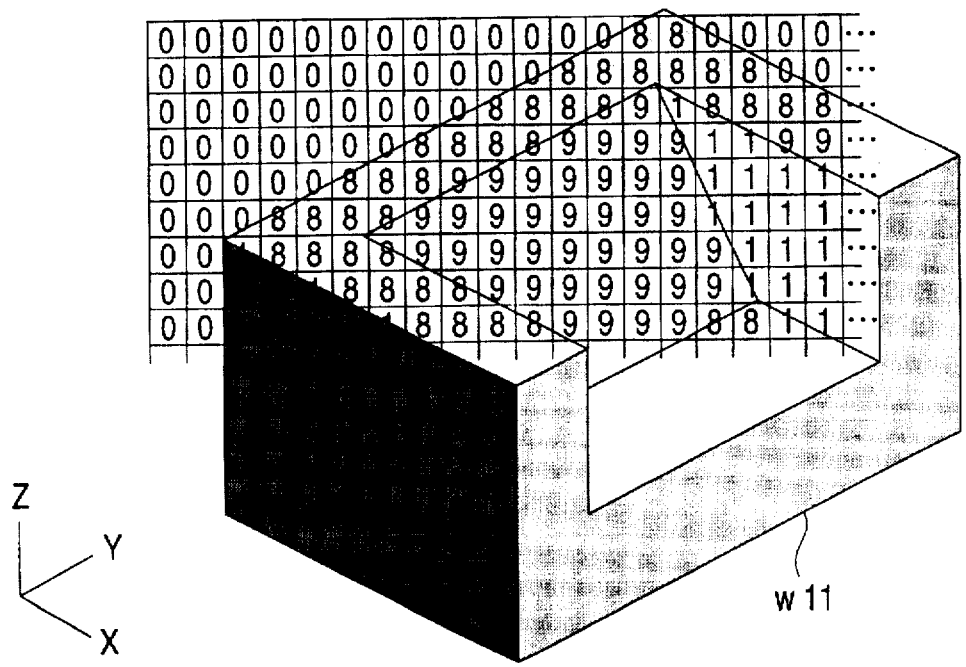
FIG. 18 is an illustration showing the brightness value after calculation of the brightness of the finished profile in die sinking electrospark machining in the CAD/CAM apparatus shown in FIG. 1.

With respect to the operation according to this embodiment having the above-described configuration, a method for obtaining a finished profile, by die sinking electrospark machining of a workpiece with the electrode through displaying of shaded images of the workpiece, dynamic cutting operations and finished profile while generating the path for die sinking electrospark machining, is described referring to the flow chart shown in FIG. 2, the workpiece shape mode diagram shown in FIG. 3, the electrode shape mode diagram shown in FIG. 4, the finished profile mode diagram shown in FIG. 5, the electrospark machining condition mode diagram shown in FIG. 6, the path mode diagram shown in FIG. 7, the workpiece shape shaded display mode diagram shown in FIG. 8, the dynamic operation shaded display mode diagram shown in FIGS. 9 and 10, the finished profile shaded display mode diagram shown in FIG. 11, the display screen pixel mode diagram shown in FIG. 12, the workpiece Z height mode diagram shown in FIGS. 13A and 13B, the electrode Z height mode diagram shown in FIGS. 14A and 14B, the dynamic operation shaded display Z height mode diagram shown in FIGS. 15 and 16, the brightness calculation mode diagram shown in FIG. 17, and the brightness data mode diagram shown in FIG. 18.

The desired shape of a workpiece w1 is generated by the profile generating unit 12 by entering a command for generating a rectangular parallelopiped shown in FIG. 3 and width wx1, length wy1 and thickness wz1 of the workpiece w1 from the input unit 2. (Step S1: Designate Shape of Workpiece)

Electrode shape e1 is generated by the profile generating unit 12 by entering an electrode shape generating command and length ey1, width ex1, thickness ez1, shank length es1 and shank diameter ed1 of the electrode shown in FIG. 4 from the input unit 2. (Step S2: Designate Generation of Electrode Shape)

In addition, a machining position p1 is generated by entering a command for generating a machining position shown in FIG. 5 and the X coordinate px1, Y coordinate py1 and z coordinate pz1 of the machining position p1 from the input unit 2. (Step S3: Designate Machining Position)

An electrospark machining conditions table shown in FIG. 8 is displayed by entering a command for displaying the electrospark machining conditions table shown in FIG. 6, and a machining process is generated by entering the electrospark machining conditions from the input unit 2. (Step S4: Designate Machining Process)

A command for generating a path K1 for electrospark machining shown in FIG. 7 is entered from the input unit 2. (Step S5: Designate Generation of Path)

In addition, The CPU 1 generates the Z height data of the workpiece shown in FIGS. 13A and 13B in the Z height generating unit 14 according to the path generating command. The Z height is given as a height bz1 corresponding to the number of pixels shown in FIG. 13B based on the numbers of vertical and horizontal pixels bx1 and by1 of the screen d1 shown in FIG. 12. (Step S6: Designate Generation of Z Height of Workpiece Shape)

The CPU 1 instructs the Z height generating unit 14 to generate Z height data of the electrode shown in FIGS. 14A and 14B according to the path generation command. The Z height is presented as a height bz2 corresponding to the number of pixels shown in FIG. 14B on the basis of the numbers of vertical and horizontal pixels bx1 and by1 shown in FIG. 12. (Step S7: Designate Generation Z Height of Shape of Electrode)

Subsequently, the CPU 1 instructs the die sinking electrospark machining path generation unit 18 to generate a path K1 up to the machining position p1 shown in FIG. 7. (Step S8: Designate Generation of Path)

In addition, the CPU 1 instructs the Z height generating unit 14 to gradually move the electrode e1 along the path K1 shown in FIG. 7, as indicated in FIGS. 15, and to transfer the Z height of the surface of the electrode to the Z height of the workpiece to update the Z height of the workpiece. (Step S9: Designate Updating of Z Height)

The CPU 1 instructs the brightness generating unit 15 to calculate the brightness from angles a1 and a2 formed by normal vectors n1 and n2 of the machining surface shown in FIG. 17 and the direction vector r1 of the light from the light source. In this embodiment, the brightness is calculated by the equation given below, assuming the value of the highest brightness is 9, the value of the lowest brightness is 1 and the value of the background is 0.

$$\text{Brightness} = 10 \times \cos(a) - 1$$

(a): Formed angle

In this embodiment, the value of brightness on the machining surface of the bottom in die sinking electrospark machining is approximately 8 and the value of brightness on the slanted machining surface is approximately 9, as shown in FIG. 18. The brightness is similarly calculated with respect to the shape of the electrode. (Step S10: Designate Calculation of Brightness)

Subsequently, the CPU 1 instructs the display unit 3 to display a shaded image of the workpiece as shown in FIG. 8, then a shaded image of dynamic operation of the workpiece being machined and the electrode in machining, as shown in FIG. 9. When the electrode e1 shown in FIG. 16B reaches the machining position p1 shown in FIG. 7 by repeating steps 39 and 40, the dynamic operating image of the workpiece and the electrode as shown in FIG. 10 and the finished profile shown in FIG. 11 are displayed, thus finishing the processing. (Step S11: Designate Display of Dynamic Operating Image)

As described above, the CAD/CAM apparatus is adapted to display the shape of electrode and the shape of the workpiece or the finished profile in shaded patterns and therefore the progress and result of machining in die sinking electrospark machining can be precisely and visually checked before actual machining, and faulty machining can be prevented before actual die sinking electrospark machining.

Figure 19A:
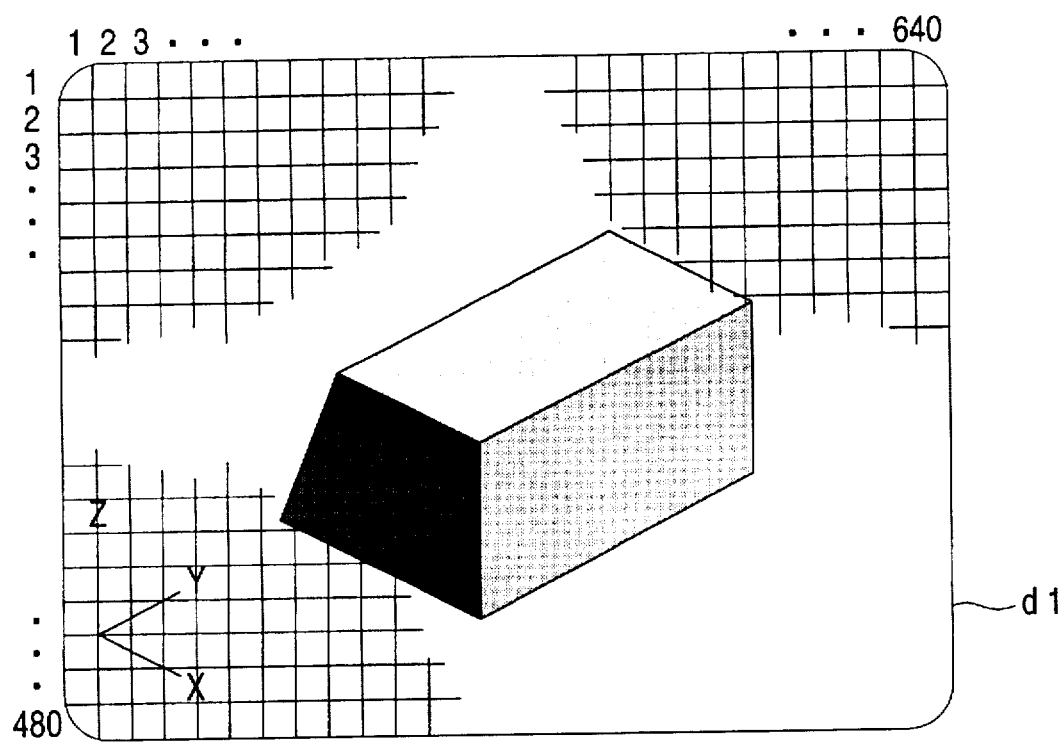
FIGS. 19A and 19B are illustrations showing the structure of Z height data of the shape of the electrode which is generated by inverting the Z height data obtained from machining by the machining center in the CAD/CAM apparatus shown in FIG. 1.
Figure 19B:
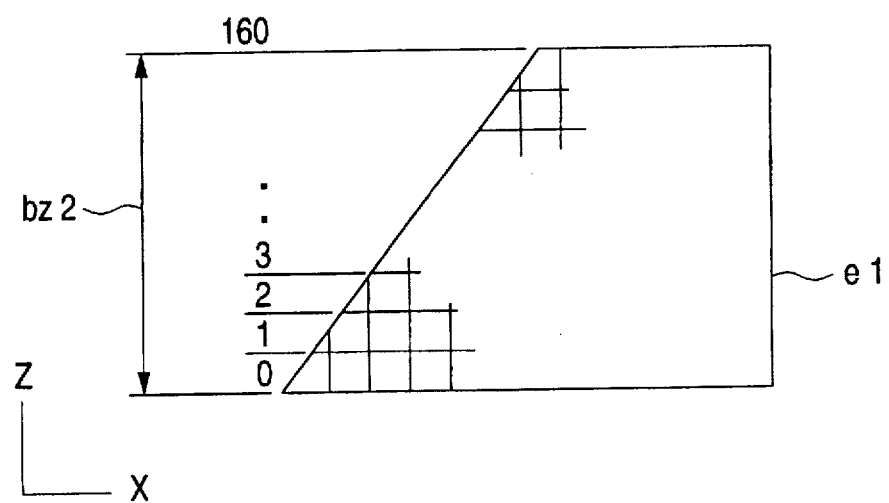

The operation of the Z height inverting unit 17 is described referring to FIGS. 19A and 19B. In case of machining an electrode for use in die sinking electrospark machining by the machining center, the Z height data of the shape of the workpiece shown in FIG. 19B is similarly generated from a rectangular parallelopiped workpiece through steps 3a to 11a shown in FIG. 21, and the data of the electrode e1 for die sinking electrospark machining shown in FIGS. 14A and 14B is generated from the Z height inverting unit 17. (Step S7: Designate Generation of Z Height of Shape of Electrode)

Figure 20:
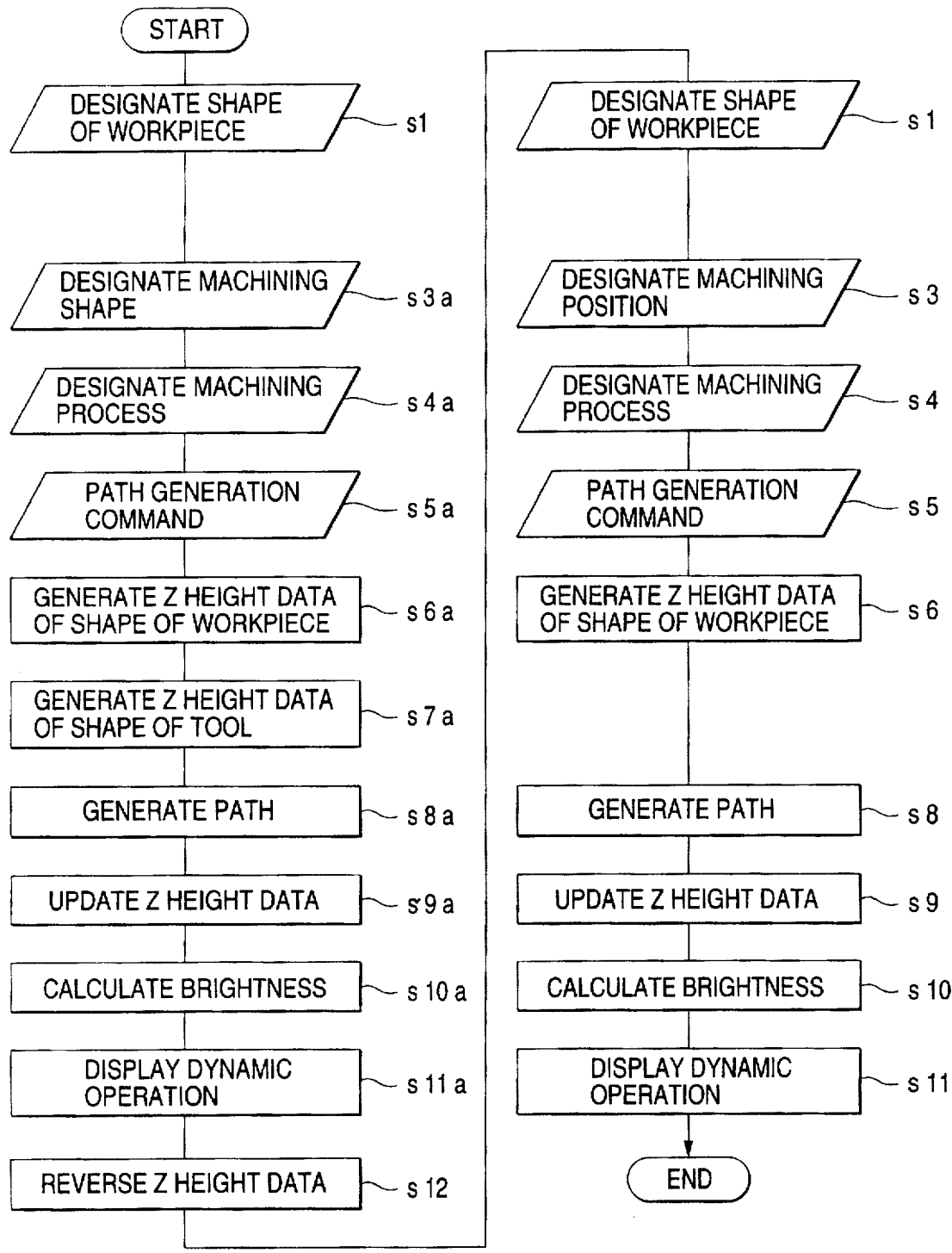
FIG. 20 is a flowchart showing a machining simulation display method for continuously generating a machining path in accordance with a defined machining shape and machining process in a machining center machining and a die electrospark machining.

FIG. 20 is a flowchart showing a machining simulation display method for continuously generating a machining path in accordance with a defined machining shape and machining process in machining center machining and die electrospark machining. As shown in the figure, this machining simulation display method is composed of a machining center machining path generating step (S8a) of generating a machining path for the machining center, a Z height generating step (S9a) of converting defined shapes of a workpiece and a tool into pixel data in terms of Z height and updating the Z height pixel data in response to the operation of the tool while the machining path is being generated, a brightness generating step (S10a) of generating brightness data of the shapes of the workpiece and the tool from the Z height pixel data and updating the brightness data in response to the operation of the tool while the machining path is being generated, a Z height inverting step (S12) of inverting the Z height pixel data of the workpiece generated by the Z height generating step and generating Z height pixel data of an electrode for die sinking electrospark machining, a die electrospark machining path generating step (S8) of generating a machining path for the die sinking electrospark machining, a Z height generating step (S9) of converting defined shapes of a workpiece and electrode into pixel data in terms of Z height and updating the Z height pixel data in response to the operation of the electrode while the machining path is being generated, and a brightness generating step (S10) of generating brightness data of the shapes of the workpiece, tool and electrode from the Z height pixel data and updating the brightness data in response to the operation of the electrode while the machining path is being generated.

That is, the CAD/CAM apparatus is provided with the Z height inverting unit to invert the Z height data for displaying the workpiece in electrode machining by the machining center and use the Z height data for displaying the electrode when generating the path for die sinking electrospark machining, and therefore the shape of the electrode need not be re-entered.

In addition to the above case of machining of the electrode by the machining center, the Z height data of the electrode for die sinking electrospark machining is similarly generated by inverting the Z height data of the shape of the workpiece generated along the path generated by the wire electrospark machining path generation unit 19. (Step S7: Designate Generation of Z Height Data of Shape of Electrode)

Figure 21:
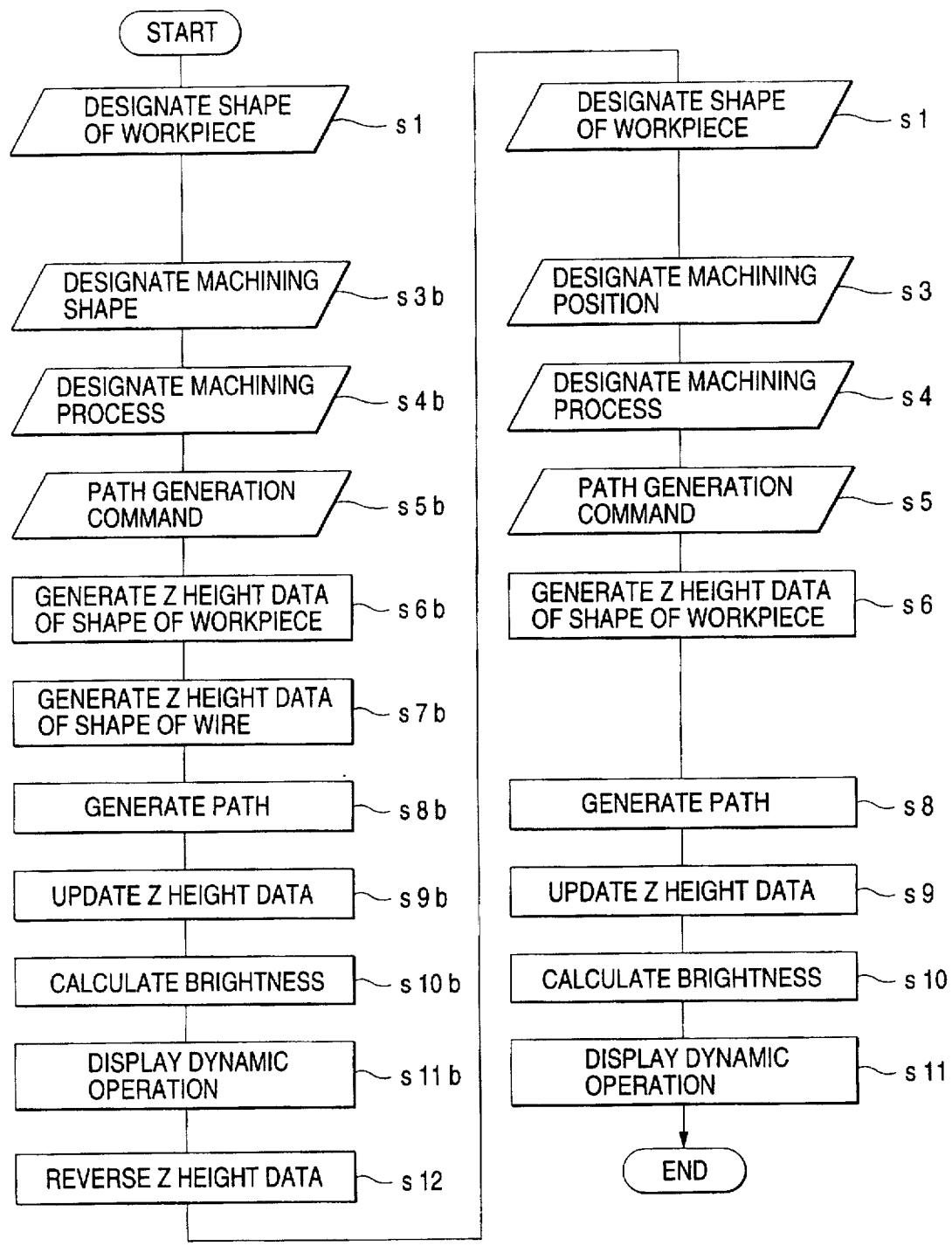
FIG. 21 is a flowchart showing a machining simulation method for continuously generating a machining path in accordance with a defined machining shape and machining process in wire electrospark machining and die sinking electrospark machining.

FIG. 21 is a flowchart showing a machining simulation method for continuously generating a machining path in accordance with a defined machining shape and machining process in wire electrospark machining and die sinking electrospark machining.

As shown in the figure, this machining simulation method is composed of: a wire electrospark machining path generating step (S8b) of generating a machining path for the wire electrospark machining, a Z height generating step (S9b) of converting defined shapes of a workpiece and a tool into pixel data in terms of Z height and updating the Z height pixel data in response to the operation of the tool while the machining path is being generated, a brightness generating step (S10b) of generating brightness data of the shapes of the workpiece and the tool from the Z height pixel data and updating the brightness data in response to the operation of the tool while the machining path is being generated, a Z height inverting step (Step S12) of inverting the Z height pixel data of the workpiece generated by the Z height generating step and generating Z height pixel data of an electrode for die sinking electrospark machining, a die electrospark machining path generating step (S8) of generating a machining path in the die sinking electrospark machining, a Z height generating step (S9) of converting defined shapes of the workpiece and the electrode into pixel data in terms of Z height and updating the Z height pixel data in response to the operation of the electrode while the machining path is being generated, and a brightness generating step (S10) of generating brightness data of the shapes of the workpiece, the tool and the electrode from the Z height pixel data and updating the brightness data in response to the operation of the electrode while the machining path is being generated.

That is, the CAD/CAM apparatus is provided with the Z height inverting unit to invert the Z height data for displaying the workpiece in electrode machining by wire electrospark machining and use the Z height data for displaying the electrode when generating the path for die sinking electrospark machining, and therefore the shape of the electrode need not be re-entered.

The operation of the machining conditions automatic calculating unit 22 is described below. The CPU 1 instructs the machining conditions automatic calculating unit 22 to automatically calculate the moving speed of the cutting tool from the machining conditions such as the diameter of the cutting tool and the type of material of the workpiece in accordance with the volume of stock to be removed by cutting obtained in the Z height generating unit 14 by accumulating the numbers of pixels in X, Y and Z directions to be removed in the path of the machining center. Particularly, the volume of the stock to be removed is proportional to the machining load with respect to the feed rate, and therefore the machining load is maintained at a fixed level by varying the feed rate in inverse proportion to the variation of the volume of the stock to be removed. In case that the feed rate is changed in one block of the path, the one block is divided into a plurality of smaller blocks for which the feed rates are different. However, if the feed rate gradually varies, particularly at the joint portion of the blocks of the path within one block, a threshold value is provided for the feed rate to prevent derivation of a number of blocks from one block. (Step S4: Designate Machining Processes)

Figure 24:
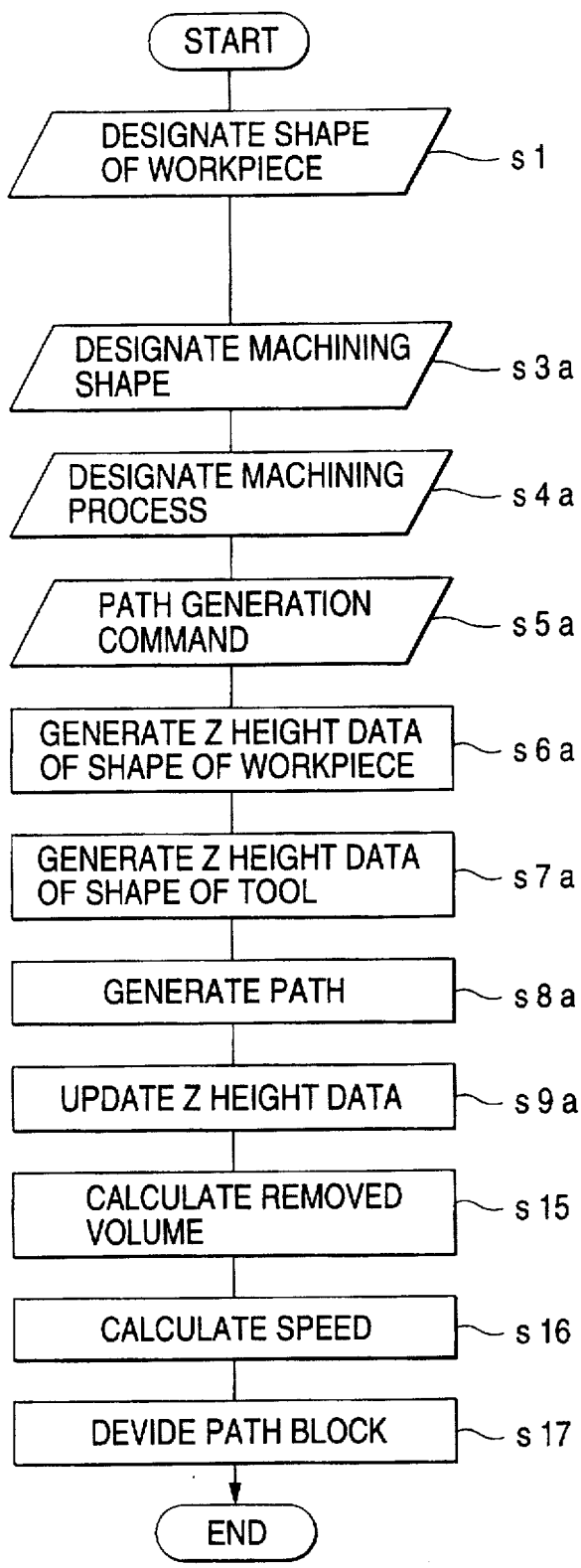
FIG. 24 is a flowchart showing automatically calculating a machining condition in a machining center machining in a machining simulation method for continuously generating a machining path in accordance with a defined workpiece shape and machining process for a machining center machining.

FIG. 24 is a flowchart showing automatically calculating machining conditions for a machining center in a machining simulation method for continuously generating a machining path in accordance with a defined workpiece shape, and a machining process for a machining center.

As shown in the figure, this machining simulation method is composed of a machining center machining path generating step (S8a) of generating a machining path for the machining center, a Z height generating step (S9a) of converting defined shapes of a workpiece and a tool into pixel data in terms of Z height and updating the Z height pixel data in response to the operation of the tool while the machining path is being generated, a removed volume calculating step (S15) of calculating a volume of stock removed from the workpiece by the tool in response to the operation of the tool, a speed calculating step (S16) of calculating a tool feed speed in accordance with the volume of removal, and a block dividing step (S17) of dividing one block into a plurality of blocks and determining a speed for each divided block.

That is, the CAD/CAM apparatus is provided with the machining conditions automatic calculating unit 22 to allow the operator to easily enter the machining conditions and eliminate the necessity of high level skills for determining the machining conditions.

The operation of the electrical conditions automatic calculating unit 23 is described below. The CPU 1 instructs the electrical conditions automatic calculating unit 23 to automatically calculate electrical conditions for the electrode from conditions such as the materials of the workpiece and electrode according to the volume of the stock to be removed obtained by accumulating the numbers of pixels in X, Y and Z directions to be removed in one path of die sinking electrospark machining in the Z height generating unit 14. (Step S4: Designate Machining Processes)

Figure 25:
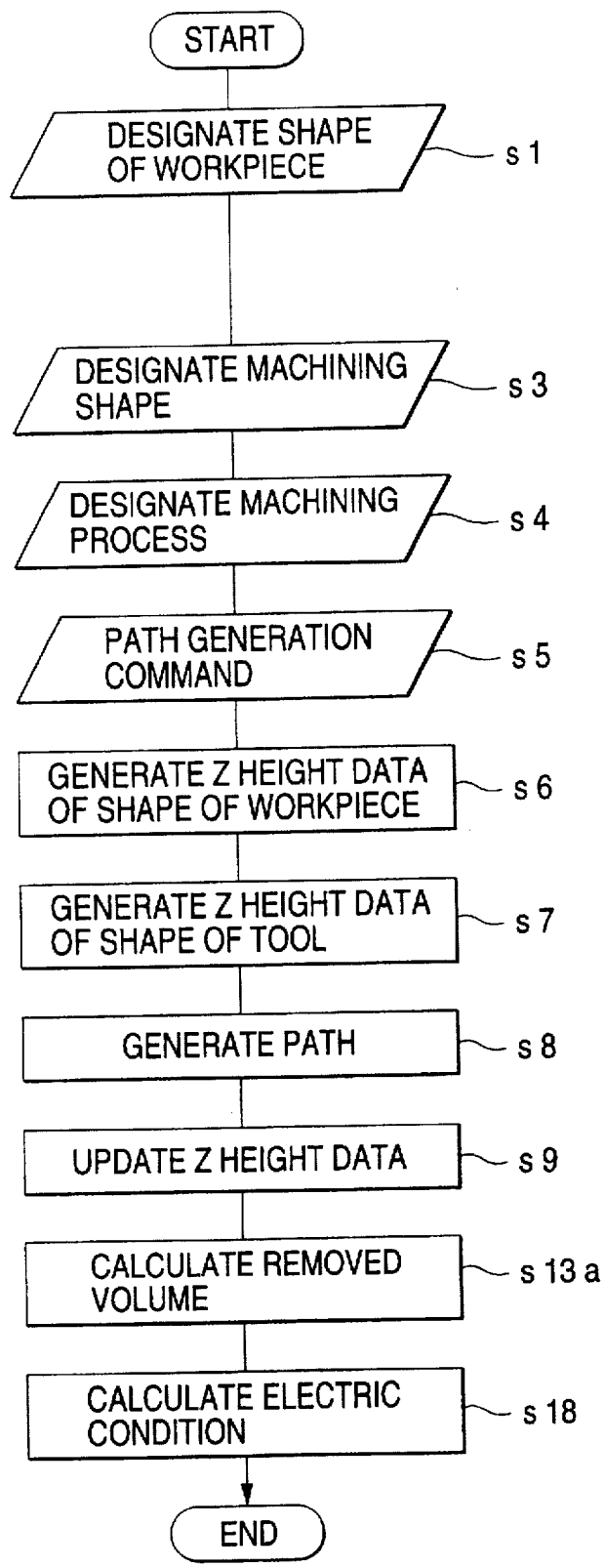
FIG. 25 is a flowchart showing automatically calculating an electric condition of an electrode in a machining simulation method for continuously generating a machining path in accordance with a defined machining shape and machining process in die sinking electrospark machining.
Figure 26:
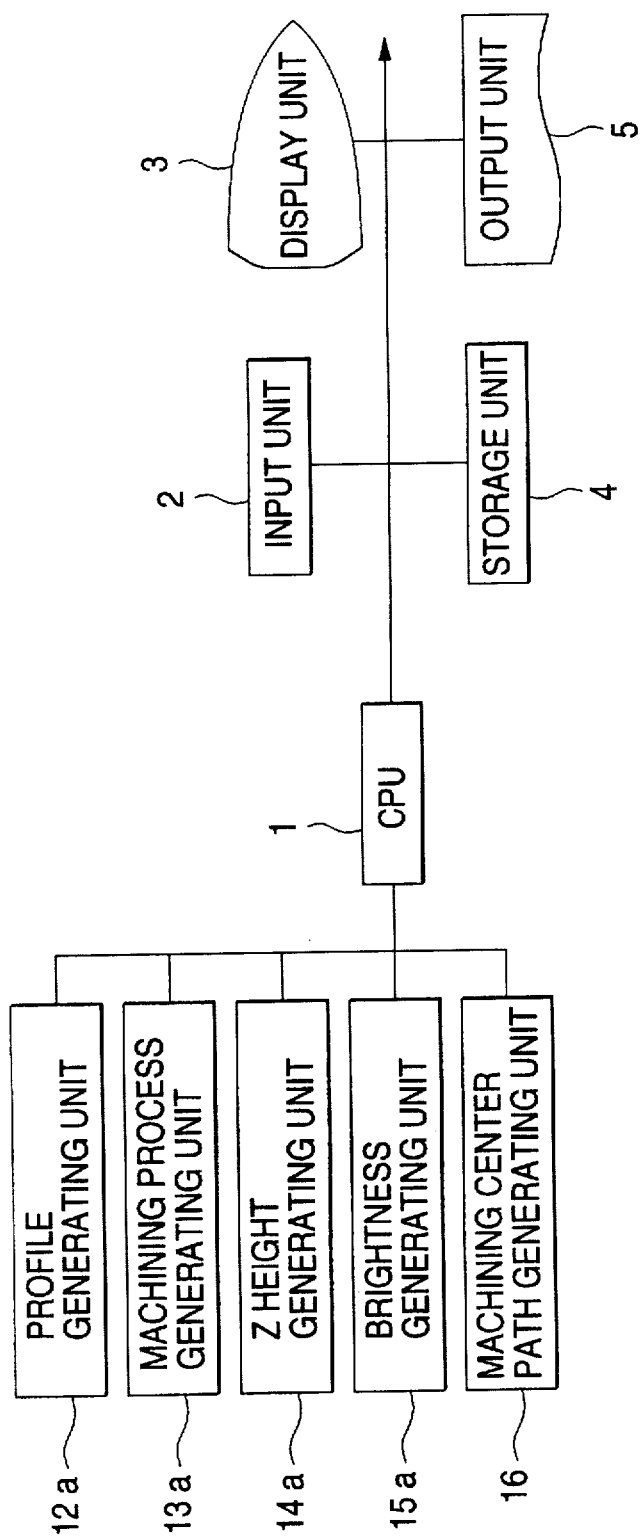
FIG. 26 is a block diagram showing a construction of the conventional CAD/CAM apparatus.
Figure 27:
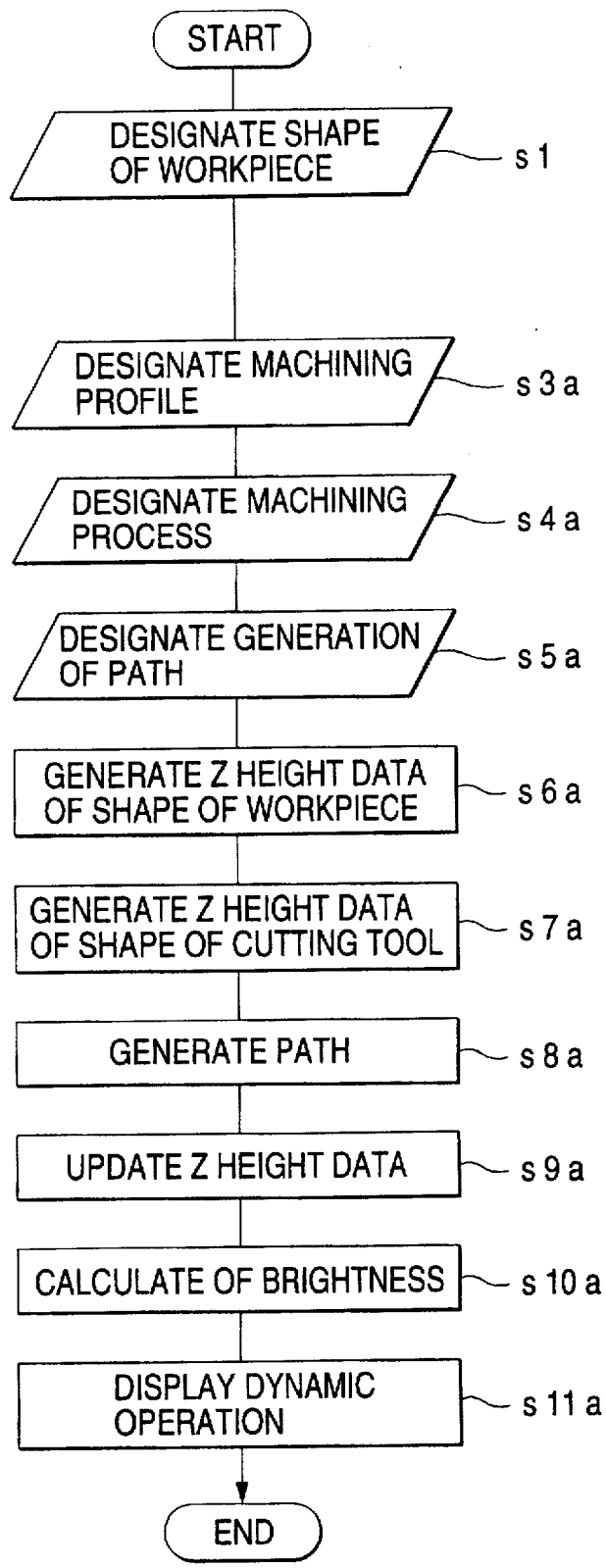
FIG. 27 is a flow chart showing the processes of dynamic operation in the conventional CAD/CAM apparatus.
Figures 28, 29:
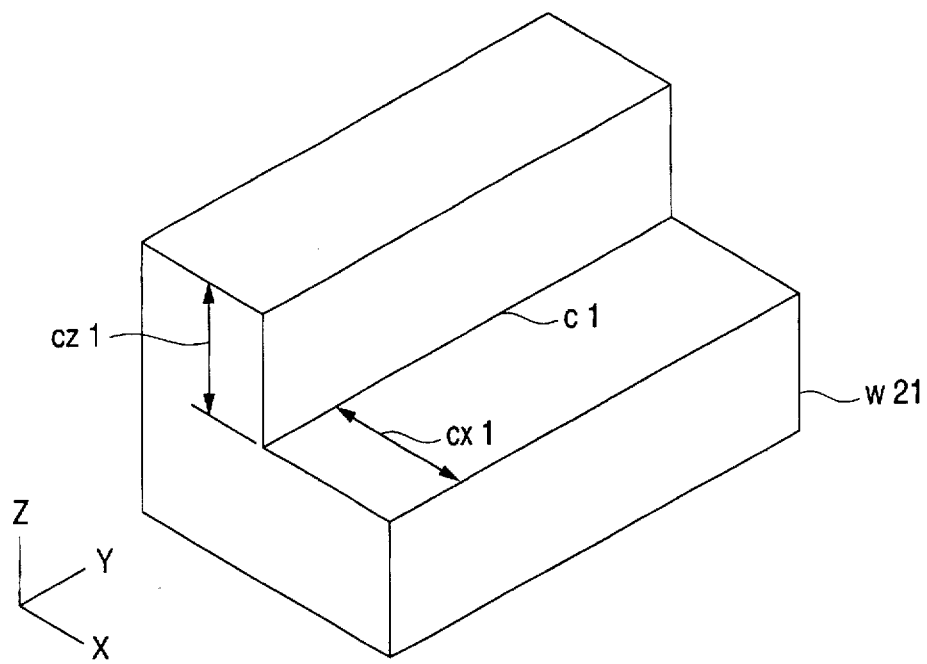
FIG. 28 is an illustration showing a machining profile for machining by the machining center in the conventional CAD/CAM apparatus.
FIG. 29 is an illustration showing the machining processes by the machining center in the conventional CAD/CAM apparatus.
Figure 30A:
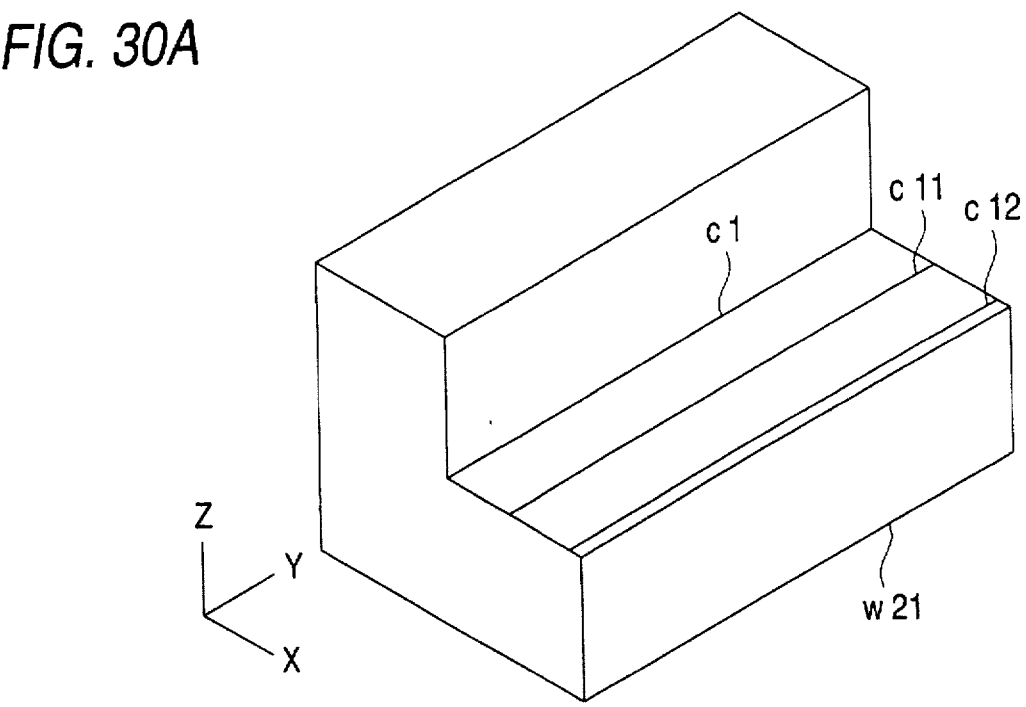
FIGS. 30A and 30B are illustrations showing a path of the machining center in the conventional CAD/CAM apparatus.
Figure 30B:
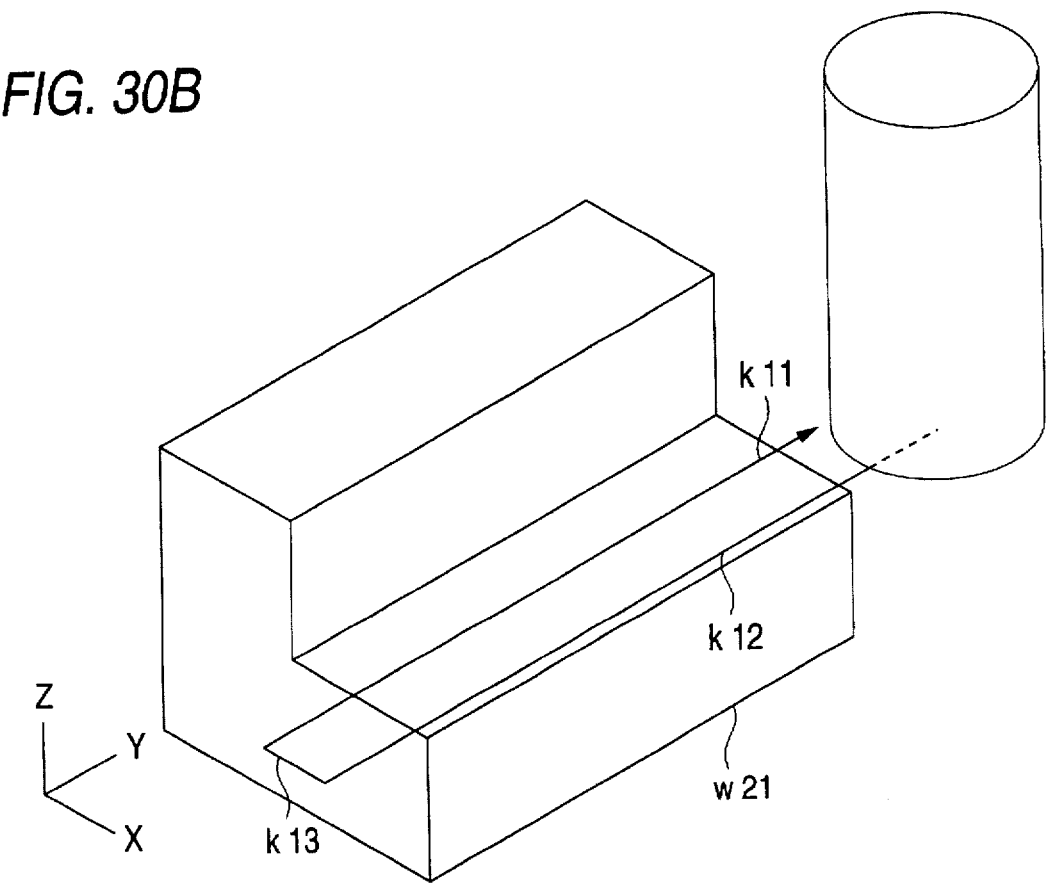
Figure 31:
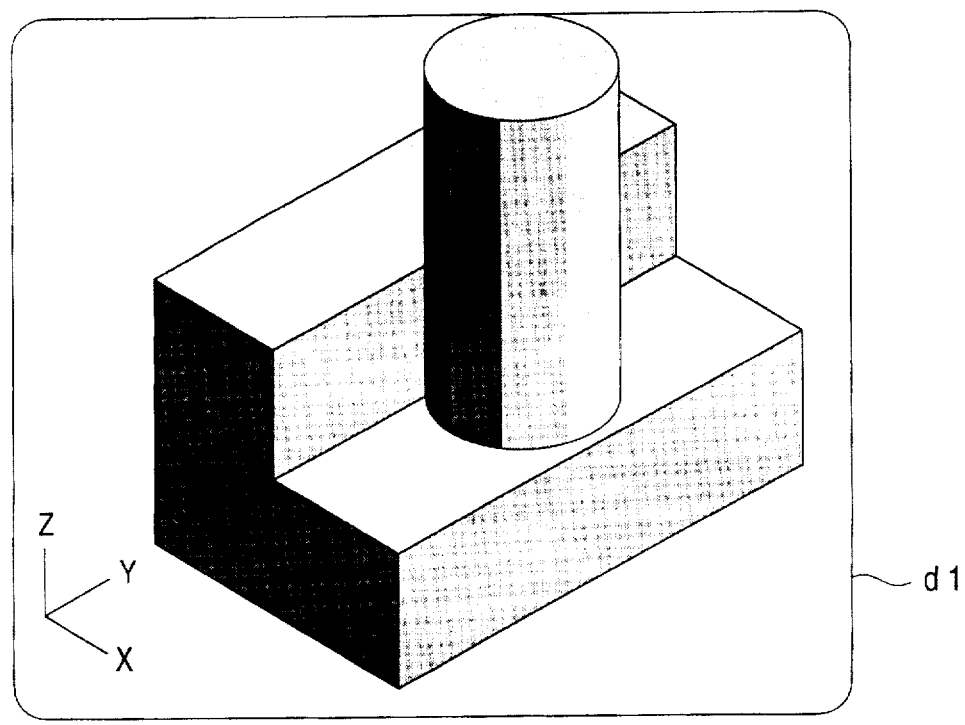
FIG. 31 is an illustration showing a shaded dynamic operating image of a shape of a workpiece and an electrode being machined by the machining center in the conventional CAD/CAM apparatus.
Figure 32:
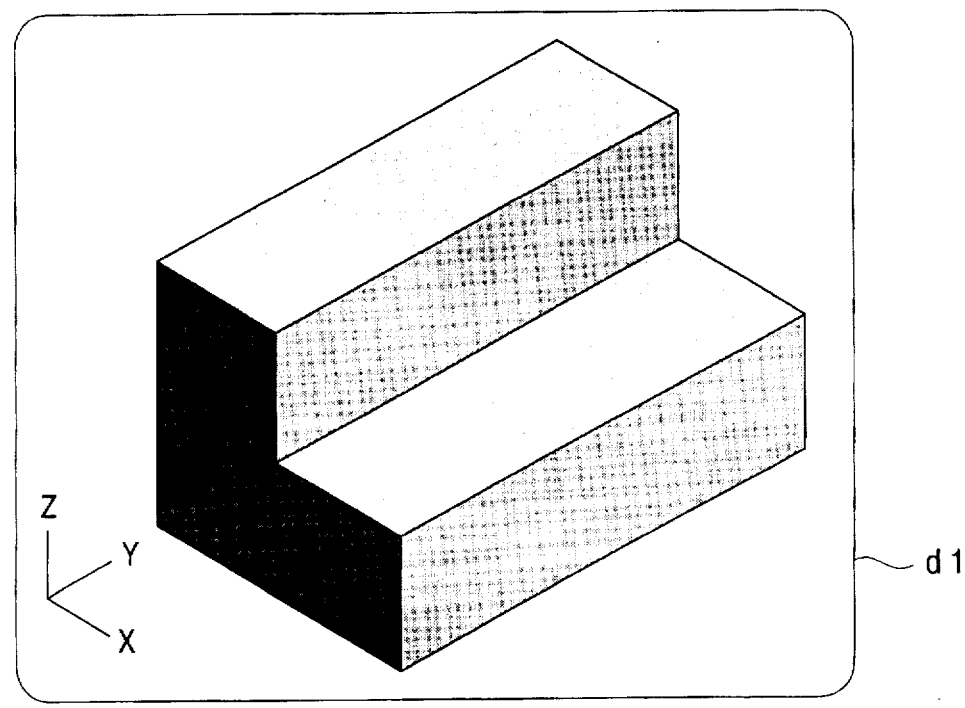
FIG. 32 is an illustration showing a shaded image display of the finished profile after having been machined by the machining center in the conventional CAD/CAM apparatus.
Figure 33A:
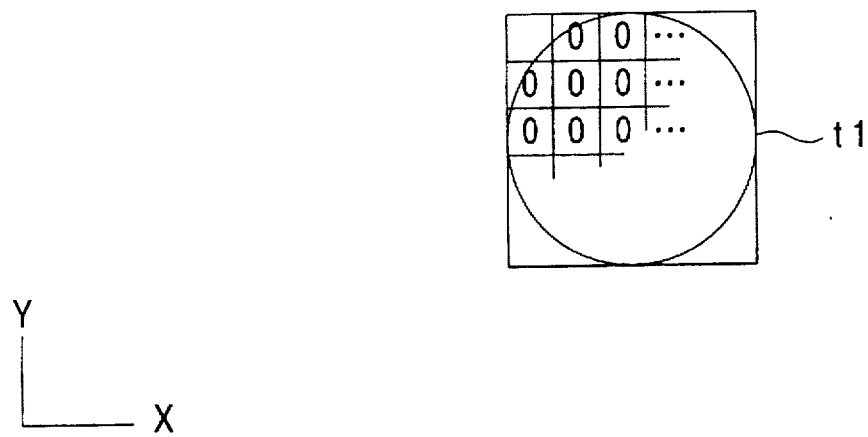
FIGS. 33A and 33B are illustrations showing a structure of Z height data of the shape of a cutting tool for the machining center in the conventional CAD/CAM apparatus.
Figure 33B:
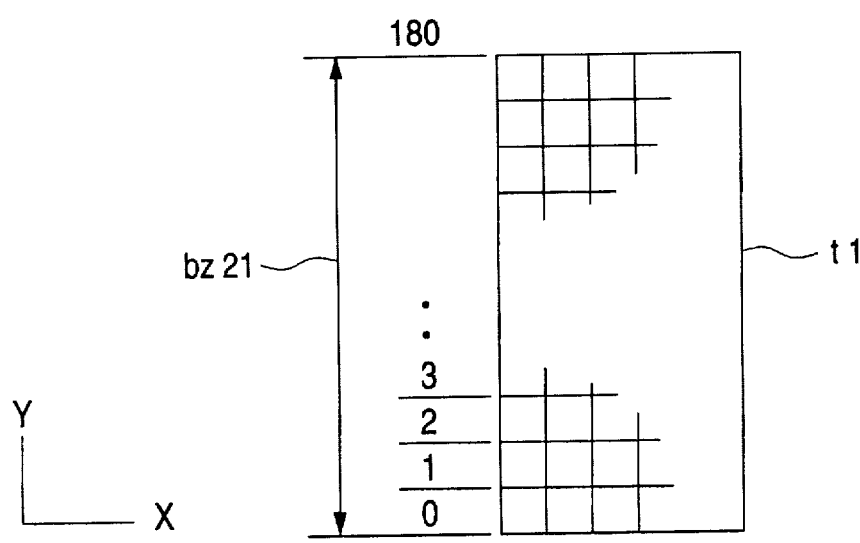
Figure 34A:
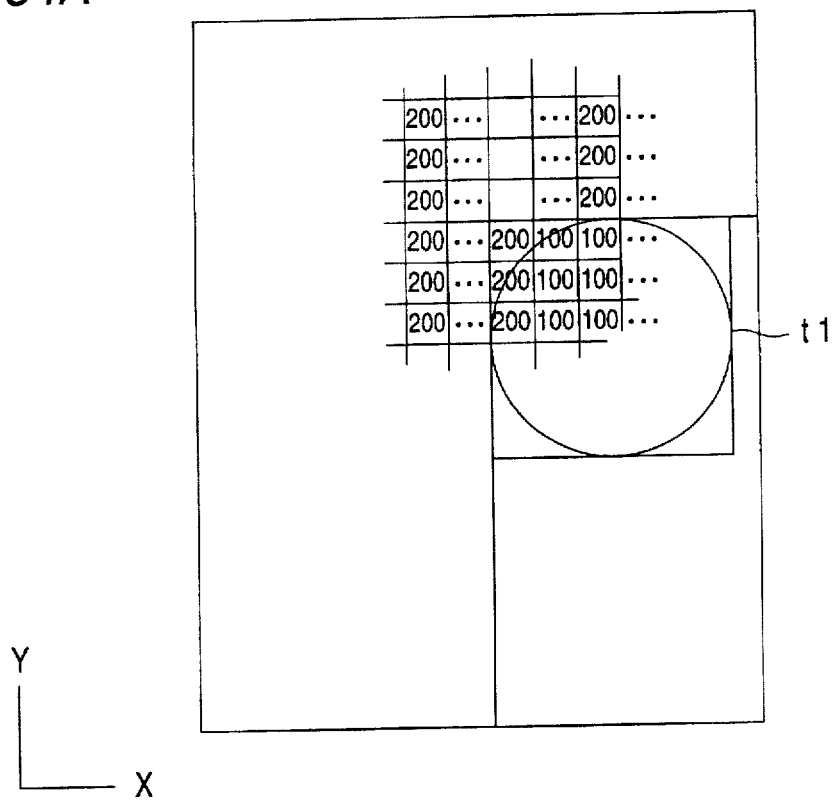
FIGS. 34A and 34B are illustrations showing a structure of Z height data in the shaded dynamic operating image of the shapes of the workpiece and the electrode being machined by the machining center in the conventional CAD/CAM apparatus.
Figure 34B:
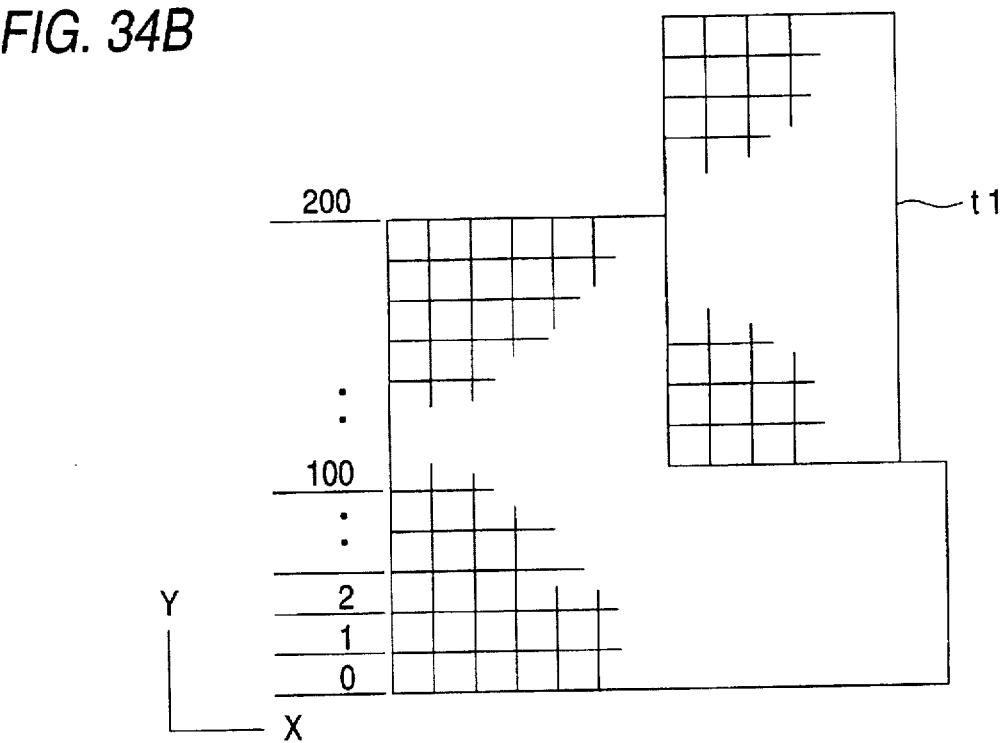
Figure 35:
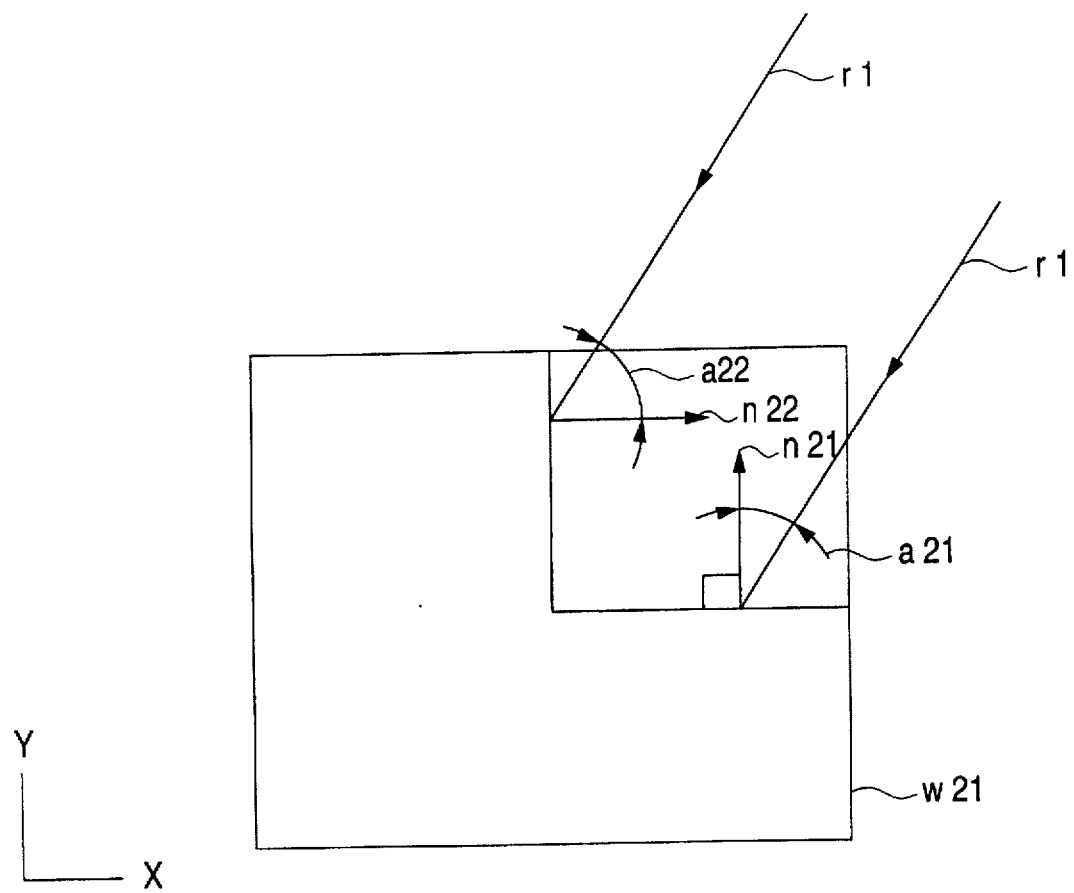
FIG. 35 is an illustration for calculation of the brightness of the finished profile for machining by the machining center in the conventional CAD/CAM apparatus.
Figure 36:
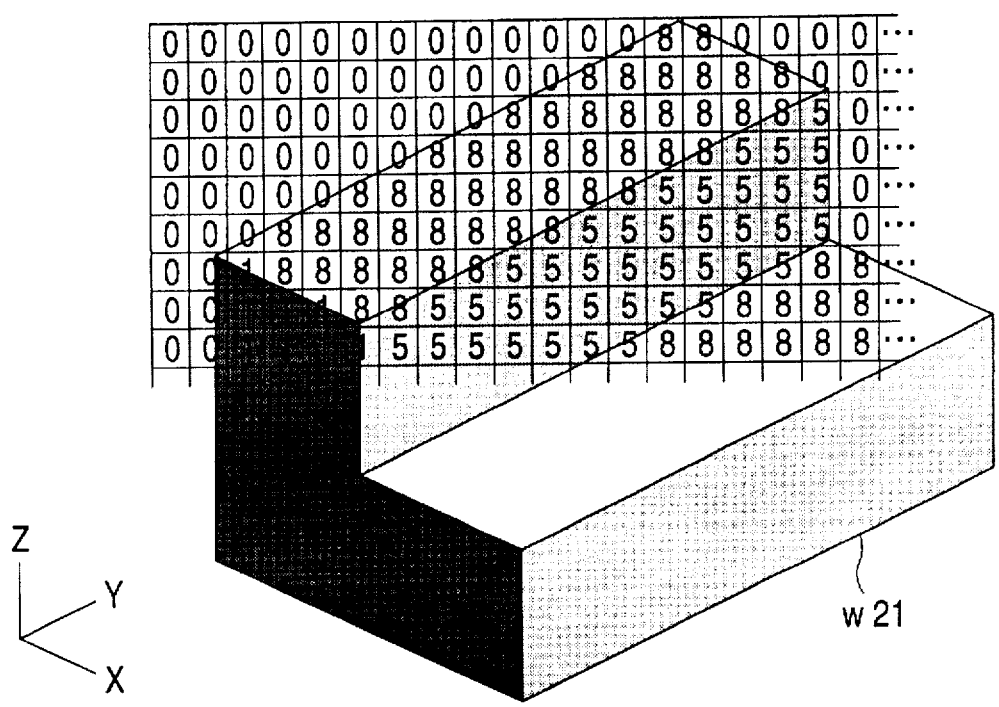
FIG. 36 is an illustration showing the brightness after calculation in the conventional CAD/CAM apparatus.

FIG. 25 is a flowchart showing automatically calculating an electric condition of an electrode in a machining simulation method for continuously generating a machining path in accordance with a defined machining shape and machining process in die sinking electrospark machining.

As shown in the figure, this machining simulation method includes: a die electrospark machining path generating step (S8) of generating a machining path for the die sinking electrospark machining, a Z height generating step (S9) of converting defined shapes of a workpiece and an electrode into pixel data in terms of Z height and updating the Z height pixel data in response to the operation of the electrode while the machining path is being generated, a removed volume calculating step (S13a) of calculating a volume of removal which is removed from the workpiece by the electrode in response to the operation of the electrode, and an electric condition calculating step (S18) of calculating an electric condition in accordance with the volume of removal.

That is, the CAD/CAM apparatus is provided with the electrical conditions automatic calculating unit 23 to enable automatic calculation of electrical conditions for die sinking electrospark machining, and therefore allow the operator to easily enter the electrical conditions, thereby eliminating the necessity for high level skills for determining the electrical conditions.

The operation of the path checking unit 20 is described below. The CPU 1 instructs the path checking unit 20 to read a generated path and carry out similar processing, as in Steps 12, 13, 14, 15, 17 and 18, and the display unit 3 to display a shaded finished profile shown in FIG. 11. (Step S11: Designate Display of Dynamic Operation)

Figure 22:
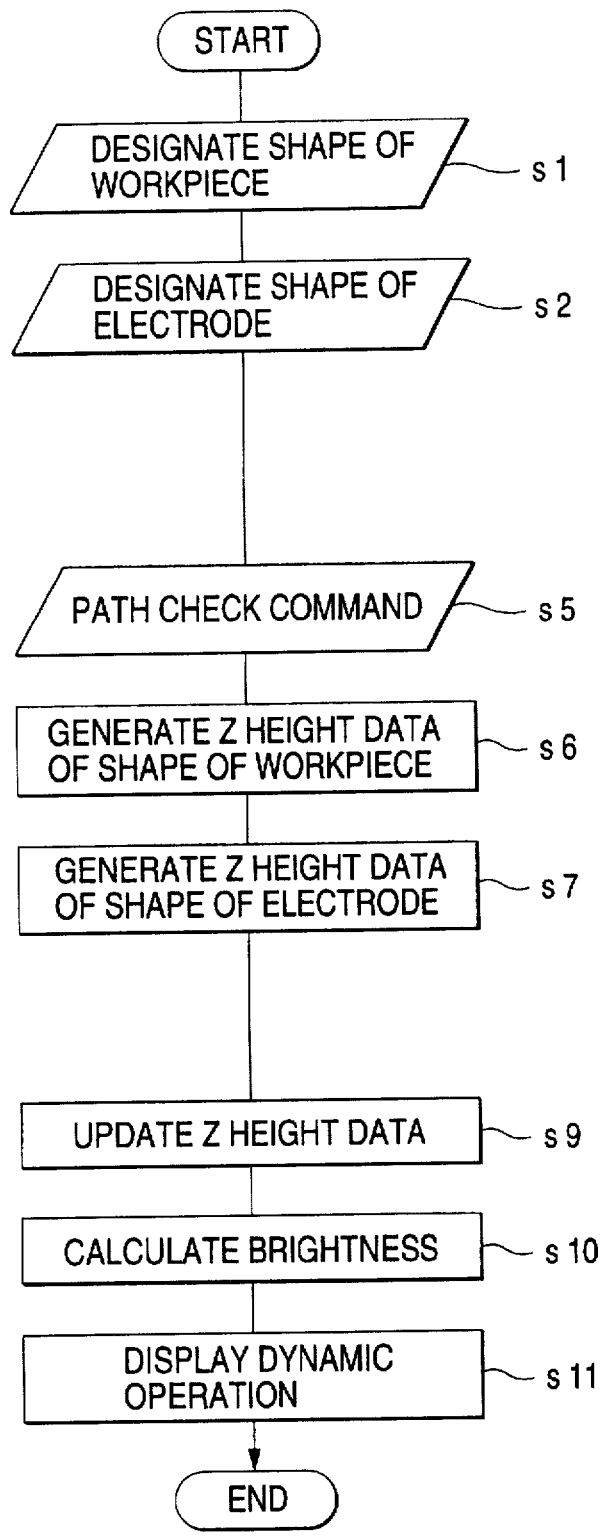
FIG. 22 is a flowchart showing a machining simulation method for continuously displaying the shape of removal and an electrode in accordance with defined shapes of a workpiece and the electrode by reading machine path data which has been generated.

FIG. 22 is a flowchart showing a machining simulation method for continuously displaying the shape of removal and an electrode in accordance with defined shapes of a workpiece and the electrode by reading machine path data which has been generated.

As shown in the figure, this machining simulation method is composed of: a Z height generating step (S9) of converting the defined shapes of a workpiece and the electrode into pixel data in terms of Z height and updating the Z height pixel data in response to the operation of the electrode while the machining path is being read, and a brightness generating step (S10) of generating brightness data of the shapes of the workpiece and the electrode from the Z height pixel data and updating the brightness data in response to the operation of the electrode while the machining path is being read.

That is, the CAD/CAM apparatus is provided with the path checking unit 20 to obtain shaded display image data of the finished profile from the generated path data and to reduce the time of repeated generation of the path.

The operation of the pixel data registering unit 21 is described below. The CPU 1 instructs the pixel data registering unit 21 to register arrays of pixels generated by the storage unit 3 and invoke the pixel arrays of the workpiece instead of entering the dimensions of the workpiece in Step 1, thus enabling the use of the pixel arrays as the shape of the workpiece. (Step S1: Designate Shape of Workpiece)

Figure 23:
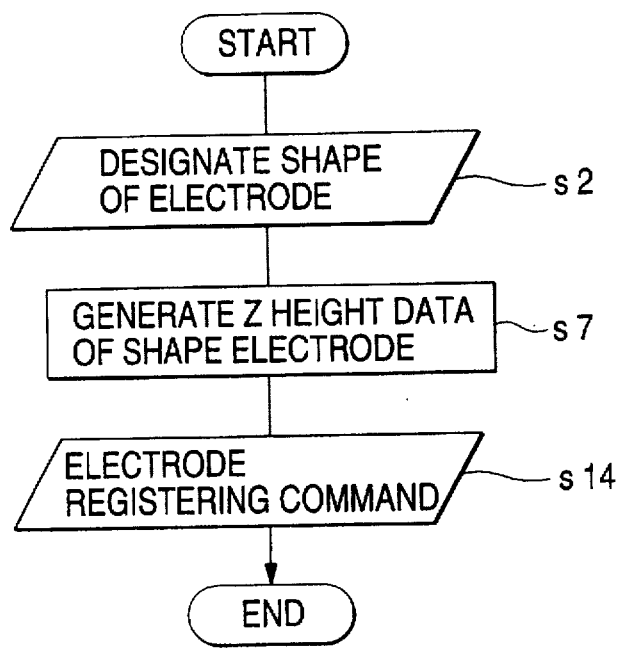
FIG. 23 is a flowchart showing an electrode registering method in a machining simulation method for continuously generating a machining path in accordance with a defined machining shape and machining process in die sinking electrospark machining.

FIG. 23 is a flowchart showing an electrode registering method in a machining simulation method for continuously generating a machining path in accordance with a defined machining shape and machining process in die sinking electrospark machining.

As shown in the figure, this electrode registering method is composed of: a step (S2) of specifying the shape of an electrode, a step (S7) of converting the shape of the electrode into pixel data in terms of Z height, and a step (S14) of registering the Z height pixel data which has been generated.

That is, the CAD/CAM apparatus is provided with the pixel registering unit to enable invoking the generated pixel data when another path is to be generated, thereby saving entry of complex input data necessary for generating a deformed workpiece.

As described above, the CAD/CAM apparatus according to the present invention is constructed to generate a machining path for die sinking electrospark machining by the die sinking electrospark machining path generation means, convert the defined shapes of the workpiece and the electrode to the Z height data and update the Z height data in response to the virtual operation of the electrode during generation of the machining path by the Z height generating means, generate the brightness data of the shapes of the workpiece and the electrode and update the brightness data in response to the virtual operation of the electrode during generation of the machining path by the brightness generating means, and display shaded images of the shape of electrode in the virtual operation and the shape of the workpiece or the finished profile by using brightness data. Accordingly, the CAD/CAM apparatus of the present invention enables precise visual checking of the progress and result of machining in die sinking electrospark machining before actual machining and prevents faulty machining in die sinking electrospark machining before actual machining.

According to the Z height inverting means of the present invention, the Z height data for displaying the workpiece when the electrode is being machined by the machining center can be used as the Z height data for display of the electrode in generation of the path for die sinking electrospark machining by inverting the Z height data. Therefore, there is an effect of eliminating the necessity of re-entry of the shape of the electrode.

According to the Z height inverting means of the present invention, the Z height data for displaying the workpiece in machining of the electrode by wire electrospark machining can be used as the Z height data for display of the electrode in generation of the path for die sinking electrospark machining by inverting the Z height data, and therefore there is an effect of eliminating the necessity of re-entry of the shape of the electrode.

The machining conditions automatic calculation means according to the present invention enables automatic calculation of the machining conditions for machining by the machining center by varying the speeds in steps in inverse proportion to the volume of the stock to be removed by cutting, which is obtained by the Z height generating means, and adjusting the cutting load during generation of the path to be approximately fixed. Therefore, the present invention provides an effect that the operator can easily enter the machining conditions and does not require high level skills for determining the machining conditions.

The electrical conditions automatic calculation means according to the present invention enables automatic calculation of the electrical conditions for die sinking electrospark machining, and therefore the present invention provides an effect that the operator can easily enter the electrical conditions and does not require high level skills for determining the electrical conditions.

The path checking means according to the present invention enables display data of a shaded image of the finished profile to be obtained from the path data generated, and therefore the present invention provides an effect that the time for repeatedly generating the path can be reduced.

The pixel data registering means according to the present invention enables registration of the generated pixel data and invoking it for generating another path, and therefore the present invention provides an effect that entry of complex input data necessary for generating an irregular profile workpiece can be eliminated.

According to the present invention, the machining simulation display method for continuously generating a machining path in accordance with a defined machining shape and machining process in a machining center machining and a die electrospark machining includes a step of generating a machining path for the machining center, a Z height generating step of converting defined shapes of a workpiece and a tool into pixel data in terms of Z height and updating the Z height pixel data in response to the operation of the tool while the machining path is being generated, a brightness generating step of generating brightness data of the shapes of the workpiece and the tool from the Z height pixel data and updating the brightness data in response to the operation of the tool while the machining path is being generated, a Z height inverting step of inverting the Z height pixel data of the workpiece generated by the Z height generating step and generating Z height pixel data of an electrode for die sinking electrospark machining, a die electrospark machining path generating step of generating a machining path for the die sinking electrospark machining, a Z height generating step of converting defined shapes of a workpiece and electrode into pixel data in terms of Z height and updating the Z height pixel data in response to the operation of the electrode while the machining path is being generated, and a brightness generating step of generating brightness data of the shapes of the workpiece, tool and electrode from the Z height pixel data and updating the brightness data in response to the operation of the electrode while the machining path is being generated. Thus, with the Z height inverting step to invert the Z height data for displaying the workpiece in electrode machining by the machining center and use the Z height data for displaying the electrode when generating the path for die sinking electrospark machining, there is an advantage in that the shape of the electrode need not be re-entered.

Also, according to the present invention, the machining simulation method for continuously generating a machining path in accordance with a defined machining shape and machining process in wire electrospark machining and die sinking electrospark machining includes a wire electrospark machining path generating step of generating a machining path for the wire electrospark machining, a Z height generating step of converting defined shapes of a workpiece and a tool into pixel data in terms of Z height and updating the Z height pixel data in response to the operation of the tool while the machining path is being generated, a brightness generating step of generating brightness data of the shapes of the workpiece and the tool from the Z height pixel data and updating the brightness data in response to the operation of the tool while the machining path is being generated, a Z height inverting step of inverting the Z height pixel data of the workpiece generated by the Z height generating step and generating Z height pixel data of an electrode for die sinking electrospark machining, a die electrospark machining path generating step of generating a machining path for die sinking electrospark machining, a Z height generating step of converting defined shapes of the workpiece and the electrode into pixel data in terms of Z height and updating the Z height pixel data in response to the operation of the electrode while the machining path is being generated, and a brightness generating step of generating brightness data of the shapes of the workpiece, the tool and the electrode from the Z height pixel data and updating the brightness data in response to the operation of the electrode while the machining path is being generated. Thus, with the Z height inverting step to invert the Z height data for displaying the workpiece in electrode machining by wire electrospark machining and the use of the Z height data for displaying the electrode when generating the path for die sinking electrospark machining, there is an advantage in that the shape of the electrode need not be re-entered.

Further, according to the present invention, the machining simulation method for continuously displaying the shape of removal and an electrode in accordance with defined shapes of a workpiece and the electrode by reading machine path data which has been generated includes: a Z height generating step of converting the defined shapes of the workpiece and the electrode into pixel data in terms of Z height and updating the Z height pixel data in response to the operation of the electrode while the machining path is being read, and a brightness generating step of generating brightness data of the shapes of the workpiece and the electrode from the Z height pixel data and updating the brightness data in response to the operation of the electrode while the machining path is being read. Thus, because the shaded display image data of the finished profile is obtained from the generated path data, there is an advantage in that the time of repeated generation of the path is reduced.

Still further, according to the electrode registering method of the present invention, the machining simulation method for continuously generating a machining path in accordance with a defined machining shape and machining process in die sinking electrospark machining includes the step of specifying the shape of an electrode, the step of converting the shape of the electrode into pixel data in terms of Z height, and the step of registering the Z height pixel data which has been generated. Thus, with the pixel registering step, the generated pixel data can in invoked when another path is to be generated with the advantage that entry of complex input data necessary for generating a deformed workpiece is saved.

Still further, according to the present invention, the machining simulation method for continuously generating a machining path in accordance with a defined workpiece shape and machining process for a machining center machining includes: a machining center machining path generating step of generating a machining path for the machining center, a Z height generating step of converting defined shapes of a workpiece and a tool into pixel data in terms of Z height and updating the Z height pixel data in response to the operation of the tool while the machining path is being generated, a removed volume calculating step of calculating a volume of removal which is removed from the workpiece by the tool in response to the operation of the tool, a speed calculating step of calculating a tool feed speed in accordance with the volume of removal, and a block dividing step of dividing one block into a plurality of blocks and determining a speed of each divided block. Thus, the step of automatically calculating the machining process for the machining center machining operation allows the operator to easily enter the machining conditions, with the advantage of eliminating the necessity of high level skills for determining the machining conditions.

Still further, according to the present invention, the machining simulation method for continuously generating a machining path in accordance with a defined machining shape and machining process in die sinking electrospark machining includes: a die electrospark machining path generating step of generating a machining path for the die sinking electrospark machining, a Z height generating step of converting defined shapes of a workpiece and an electrode into pixel data in terms of Z height and updating the Z height pixel data in response to the operation of the electrode while the machining path is being generated, a removed volume calculating step of calculating a volume of removal which is removed from the workpiece by the electrode in response to the operation of the electrode, and an electric condition calculating step of calculating an electric condition in accordance with the volume of removal. Thus, with the electrical conditions automatic calculating step of automatically calculating the electrical conditions for the die electrospark machining to enable automatic calculation of electrical conditions for die sinking electrospark machining, there is an advantage in that the operator easily enter the electrical conditions and eliminate necessity of high level skills for determining the electrical conditions.

What is claimed is:

1. A CAD/CAM apparatus for generating a machining path in accordance with a defined machining position and a defined machining process in die sinking electrospark machining, comprising:

die sinking electrospark machining path generation means for generating a machining path for said die sinking electrospark machining;

Z height generating means for converting defined shapes of a workpiece and an electrode to data in terms of Z height and updating said Z height data in response to a virtual operation of the electrode while the machining path is being generated;

brightness data generating means for generating brightness data of said shapes of the workpiece and electrode from said Z height data and updating said brightness data in response to virtual operation of said electrode while said machining in path is being generated; and display means for displaying shaded shapes of at least one of the electrode and the workpiece in virtual operation, in accordance with said brightness data, and for displaying a shade of a finished profile of at least one of the workpiece and the electrode in accordance with said brightness data.

2. A CAD/CAM apparatus according to claim 1, wherein said apparatus further comprises:

Z height rotating means for rotating said Z height data indicating the shape of the workpiece generated by said Z height generating means by 180 degrees and generating Z height data of the electrode for die sinking electrospark machining; and machining center machining path generation means for generating a machining path based on a defined machining profile and a defined machining process by a machining center, wherein the electrode for die sinking electrospark machining is machined by the machining center.

3. A CAD/CAM apparatus according to claim 1, wherein said apparatus further comprises:

Z height rotating means for rotating said Z height data indicating the shape of the workpiece generated by said Z height generating means by 180 degrees and generating Z height data of the electrode for die sinking electrospark machining; and wire electrospark machining path generation means for generating a machining path based on a defined machining profile and a defined machining process in wire electrospark machining, wherein the electrode for die sinking electrospark machining is machined by the machining center.

4. A CAD/CAM apparatus according to claim 2, wherein said apparatus further comprises machining condition automatic calculation means for automatically calculating machining conditions for the machining center including at least one of an infeed amount, a cutting tool revolution rate and a feed rate based on a volume of stock to be removed in machining processes of die sinking electrospark machining obtained by said Z height generating means, and for controlling the feed rate in accordance with a cutting load.

5. A CAD/CAM apparatus according to claim 1, wherein said apparatus further comprises electrical condition automatic calculating means for automatically calculating electrical conditions of the electrode for die sinking electrospark machining based on a volume of stock to be removed which is obtained by said Z height generating means in accordance with the types of materials of the workpiece and the electrode.

6. A CAD/CAM apparatus according to claim 1, wherein said apparatus further comprises machining path checking means for generating Z height data and brightness data in response to generated machining path data.

7. A CAD/CAM apparatus according to claim 1, wherein said apparatus further comprises image data registering means for registering Z height data and brightness data of the workpiece and the electrode obtained after the machining path has been generated as an irregular profile.

8. A machining simulation method for continuously generating a machining path in accordance with a defined machining shape and machining process in machining center machining and die sinking electrospark machining, said method comprising the steps of:

generating a machining path for said machining center;

converting defined shapes of a workpiece and a tool into pixel data in terms of Z height and updating said Z height pixel data in response to operation of the tool while the machining path is being generated;

generating brightness data of said shapes of the workpiece and the tool from said Z height pixel data and updating said brightness data in response to the operation of the tool while said machining path is being generated;

inverting said Z height pixel data of the workpiece generated by said Z height generating step and generating Z height pixel data of an electrode for die sinking electrospark machining;

generating a machining path for said die sinking electrospark machining;

converting defined shapes of a workpiece and electrode into pixel data in terms of Z height and updating said Z height pixel data in response to the operation of the electrode while the machining path is being generated; and generating brightness data of said shapes of the workpiece, tool and electrode from said Z height pixel data and updating said brightness data in response to the operation of the electrode while said machining path is being generated.

9. A machining simulation method for continuously generating a machining path in accordance with a defined machining shape and machining process in wire electrospark machining and die sinking electrospark machining, said method comprising the steps of:

generating a machining path for said wire electrospark machining;

converting defined shapes of a workpiece and a tool into pixel data in terms of Z height and updating said Z height pixel data in response to operation of the tool while the machining path is being generated;

generating brightness data of said shapes of the workpiece and the tool from said Z height pixel data and updating said brightness data in response to the operation of the tool while said machining path is being generated;

inverting said Z height pixel data of the workpiece generated by said Z height generating step and generating Z height pixel data of an electrode for die sinking electrospark machining;

generating a machining path in said die sinking electrospark machining;

converting defined shapes of the workpiece and the electrode into pixel data in terms of Z height and updating said Z height pixel data in response to the operation of the electrode while the machining path is being generated; and generating brightness data of said shapes of the workpiece, the tool and the electrode from said Z height pixel data and updating said brightness data in response to the operation of the electrode while said machining path is being generated.

10. A machining simulation method for continuously displaying the shape of removal and an electrode in accordance with defined shapes of a workpiece and the electrode by reading machine path data which has been generated, said method comprising the steps of:

converting the defined shapes of a workpiece and the electrode into pixel data in terms of Z height and updating said Z height pixel data in response to operation of the electrode while the machining path is being read; and generating brightness data of said shapes of the workpiece and the electrode from said Z height pixel data and updating said brightness data in response to the operation of the electrode while said machining path is being read.

11. A machining simulation method for continuously generating a machining path in accordance with a defined machining shape and machining process in die sinking electrospark machining, said method comprising the steps of:

specifying the shape of an electrode;

converting the shape of the electrode into pixel data in terms of Z height; and registering said Z height pixel data which has been generated.

12. A machining simulation method for continuously generating a machining path in accordance with a defined machining shape and machining process in machining center machining, said method comprising the steps of:

generating a machining path for said machining center;

converting defined shapes of a workpiece and a tool into pixel data in terms of Z height and updating said Z height pixel data in response to the operation of the tool while the machining path is being generated;

calculating a volume of removal of material removed from the workpiece by the tool in response to the operation of the tool;

calculating a tool feed speed in accordance with said volume of removal; and dividing one block into a plurality of blocks and determining a speed of each divided block when the speed in one block in said machining path is changed.

13. A machining simulation method for continuously generating a machining path in accordance with a defined machining shape and machining process in die sinking electrospark machining, said method comprising the steps of:

generating a machining path for said die sinking electrospark machining;

converting defined shapes of a workpiece and an electrode into pixel data in terms of Z height and updating said Z height pixel data in response to the operation of the electrode while the machining path is being generated;

calculating a volume of removal which is removed from the workpiece by the electrode in response to the operation of the electrode; and calculating an electric condition in accordance with said volume of removal.

* * * * *